United States Patent [19]  [11]  4,384,199
Ogino et al.  [45]  May 17, 1983

[54] INCIDENT POSITION DETECTOR FOR RADIATION BEAM

[75] Inventors: Yasuo Ogino; Yukichi Niwa; Mitsutoshi Ohwada, all of Yokohama; Kazuo Tanaka, Tokyo; Noboru Koumura, Narashino, all of Japan

[73] Assignee: Canon Kabushiki Kaisha, Tokyo, Japan

[21] Appl. No.: 190,454

[22] Filed: Sep. 24, 1980

[30] Foreign Application Priority Data

Sep. 27, 1979 [JP] Japan .................................. 54-124537
Mar. 7, 1980 [JP] Japan .................................. 55-28735
Mar. 12, 1980 [JP] Japan .................................. 55-31235
Jun. 20, 1980 [JP] Japan .................................. 55-83586

[51] Int. Cl.$^3$ .............................................. G01J 1/36
[52] U.S. Cl. ........................................ 250/204; 356/4
[58] Field of Search ............... 250/201, 204, 209, 578, 250/203; 354/25; 356/4, 5

[56] References Cited

U.S. PATENT DOCUMENTS 4,083,056 4/1978 Nakamura et al. .................. 354/25
4,253,752 3/1981 Ichihara ............................... 250/201
4,283,137 8/1981 Tsunekawa et al. ................. 250/201

*Primary Examiner*—David C. Nelms
*Attorney, Agent, or Firm*—Fitzpatrick, Cella, Harper & Sinto

[57] ABSTRACT

Disclosed is a device for detecting an incident position of radiation beam, particularly, its center or center of gravity. The detecting device is provided with a scanning type radiation beam sensing device having a plurality of radiation sensing elements in a linear arrangement, and the sensing device is disposed in such a manner that its radiation receiving surface may be substantially coincided with an incident surface of the radiation beam to be detected. When reading an output from the sensing device, the time sequential output signals from the sensing device are split into predetermined sections, and the signal quantities among the sections are compared. In this way, the position of the center or the center of gravity of the radiation beam on the incident surface is detected with the position corresponding to a split point of the signals as the reference.

51 Claims, 36 Drawing Figures

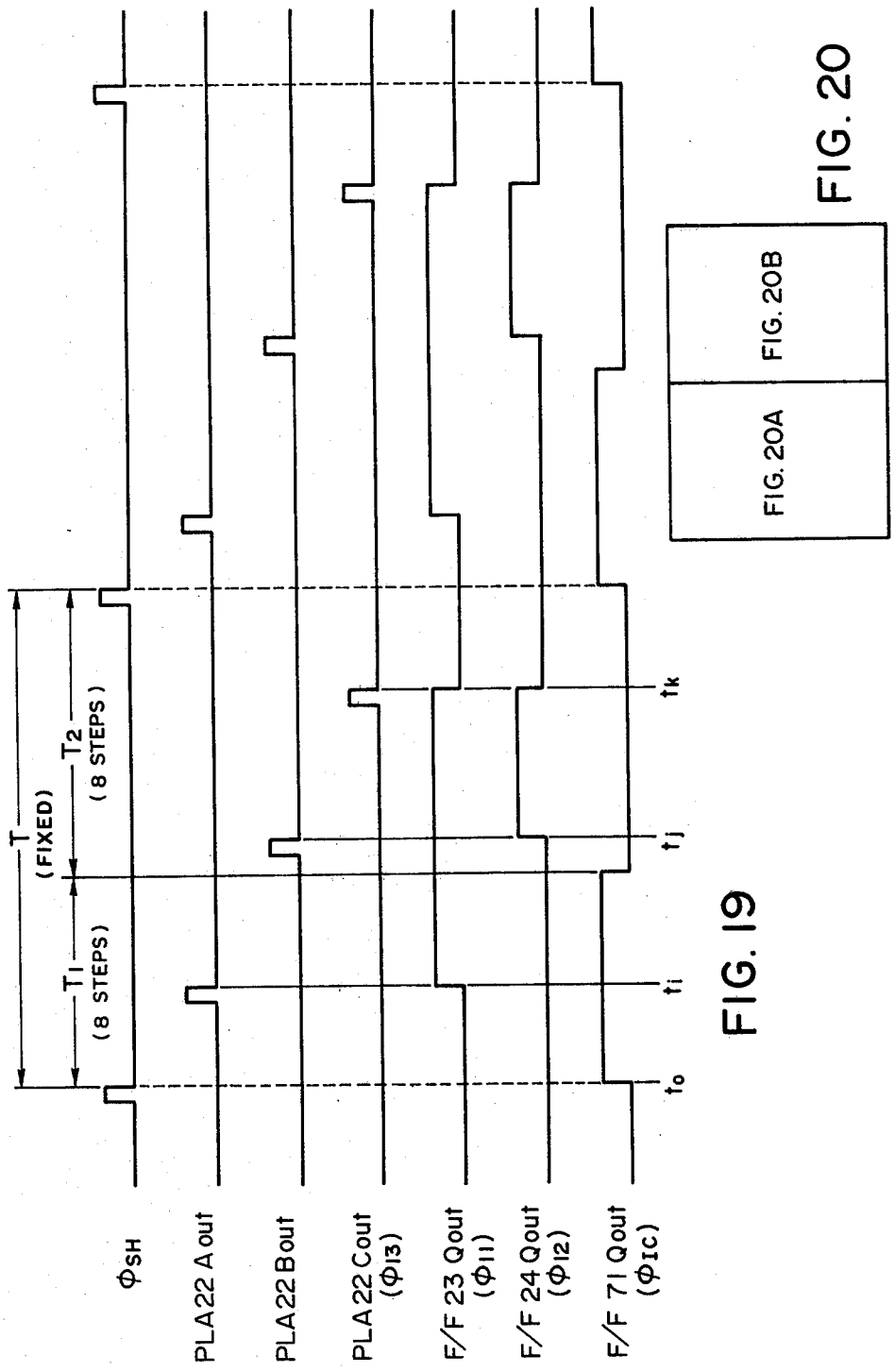

INCIDENT POSITION DETECTOR FOR RADIATION BEAM

BACKGROUND OF THE INVENTION

1. Field of the Invention

This invention relates to a device for detecting an incident position of radiation beam on a predetermined surface.

2. Description of Prior Arts

Speaking, for example, of a field of a detector such as a range finder to measure a distance to an object or a focus detecting device to find out an in-focus condition of an image forming optical system to an object, there have already been known the so-called "active type distance measuring device" or "focus detecting device", in which a distance to an object is measured, or the in-focus, condition of the image forming optical system to the target object is detected, by providing a radiation projecting means on the side of the measuring device, and projecting radiation beam such as infrared or near infrared ray toward the object, at which time variations in the incident position of the reflected radiation beam from the object on a predetermined surface is utilized for distance measurement on the target object.

U.S. patent application Ser. No. 43,250, now U.S. Pat. No. 4,357,085, of the same assignee as that of the present application discloses an example, in which a self-scanning type linear image sensing means such as CCD, BBD, MOS image sensor, etc. is adopted as the means for detecting the reflected radiation beam in such active type range finding device and the focus detecting device.

The abovementioned earlier application discloses as one embodiment thereof a device for detecting an incident position of reflected radiation beam, as one of the expedients for detecting the incident position of the reflected radiation beam in utilization of a time-sequential output of a sensor array device having a plurality of linearly arranged radiation sensing elements as the self-scanning type linear image sensing means, wherein a slice level is determined at a certain definite ratio on the basis of a peak value of the time-sequential output, based on which slice level another time-sequential output from the sensor array device to be obtained at the subsequent reading is sliced, and then a position of the sliced signal portion in the time-sequential output signal is detected. However, even with this embodimental device in the earlier application, there still remain some points to be improved. For example, this embodimental device is to judge the incident position of the reflected radiation beam by detecting a peak value of an envelope of the time sequential signal which has first been read out of the sensor array device, then setting and maintaining a slice level to be determined from this peak value at a predetermined ratio, thereafter slicing the signal envelope which has second been read out based on the determined slice level, and finally digitally determining whether the signal envelope portion which is about to be sliced is at the center of the signal envelope as a whole, or is deviated from the center to either direction of left or right. In such method of determination, the outputs from the sensor array device should be continuously read out for two times with a view to detecting the incident position of the reflected radiation beam with the consequence that a long period of time is required for the determination. Further, since the detecting limit of the signal depends on the slice level, it becomes difficult by slicing to distinguish the signal envelope in the upper and lower portions, when the peak value of the output signal becomes lowered due to the degree of convergence of the radiation beam, or due to an object being at a far distance, or an object having a low reflective power with the consequence that errors tend to occur in determining the incident position of the reflected radiation beam, and other points of problem. In view of such difficulties and inconveniences, there still remains rooms for improvements in the embodimental device of the earlier application.

Besides the above problem points, in order to attain accurate and highly precise detection of the incident position of the radiation beam, a gain control with respect to the output from the sensor array device and/or an appropriate gain control in the subsequent signal processing circuit system are essential. In this point, too, there still remains room for improvement.

Furthermore, as disclosed in the afore-described earlier U.S. patent application Ser. No. 43,250, when a signal radiation beam such as infrared or near infrared ray is projected from the device to an object, and a reflected signal radiation beam from the object is to be detected, there should essentially be made a clear distinction, for the sake of the signal processing, between radiation due to external light, etc. existing in the surrounding atmosphere and the signal radiation beam emitted from the device, in other words, there should inevitably be made a contrivance for effective elimination of the noise signal component caused by the radiation due to external light, etc. In particular, as disclosed in this earlier filed application, when the signal radiation beam is projected toward a target object to be focussed through an object lens, and a reflected signal radiation beam from the target object is to be detected through the object lens by the sensor array device (i.e., in the case of the so-called TTL (Through The Lens) type, active focus detecting device), the intensity distribution of harmful radiation due to external light, etc. existing in the surrounding atmosphere on the radiation receiving surface of the sensor array device becomes non-uniform. In order therefore to remove the noise signal component which is derived from such harmful radiation and is unavoidably included in the output from the sensor array device, a further and particular contrivance is required.

SUMMARY OF THE INVENTION

The present invention has been made under the above-mentioned circumstances, and aims at further improving the conventional radiation beam incident position detecting device which is applicable to the active type distance detecting device or the focus detecting device as mentioned above.

It is therefore the principle object of the present invention to provide an improved radiation beam incident position detector applicable to the active type distance detecting device or the focus detecting device as mentioned in the foregoing, in which a scanning type radiation sensing means having a plurality of linearly arranged radiation sensing elements is used, and which is capable of detecting, with high precision and accuracy, a positional relationship of the center or the center of gravity of the radiation on a predetermined surface by a simple method, hence, without any complication in the construction of the electrical circuit system.

For attaining the above object, the present invention proposes the radiation beam incident position detector having a more advantageous construction, wherein the radiation receiving surface of the abovementioned scanning type radiation sensing means is disposed in a manner to be substantially coincided with a plane where the radiation is impinged, and the time-sequential output signals from the sensing means are divided into predetermined sections so as to enable the signal quantity in each section to be mutually compared, and, based on the comparison of the signal quantity in each section, the position of the center or the center of gravity of the abovementioned radiation beam on the incident plane is detected with a position corresponding to the split point of the signals as a reference.

Various constructions for the concrete circuit can be adopted for the purpose. As will be described in the preferred embodiments of the present invention to appear later, a signal polarity reversing circuit and an integration circuit are combined together to reverse the polarity of the time-sequential output signals from the radiation sensing means for a predetermined section as mentioned above by the signal polarity reversing circuit, and the output signal from this signal polarity reversing circuit is integrated by the integration circuit to obtain a compared result of the signal quantities in each of the predetermined sections through this integration circuit. Such circuit construction is very simple in its construction, is easy to control, and is cheap in its manufacturing cost. It goes without saying that various other circuit constructions can be adopted for the purpose of the present invention.

It is another object of the present invention to provide a useful method of gain control to enable the incident position detection of the radiation beam to be attained with high precision and accuracy, along with the abovementioned principal object of the present invention.

For attaining the above object, the present invention proposes the radiation beam incident position detector having a more advantageous construction, wherein, according to one preferred embodiment of the present invention, a first circuit means having the integration circuit and for dividing the time-sequential output signals from the radiation sensing means into predetermined numbers of sections and comparing the signal quantities in these sections and a second circuit means to find out a sum of the signal quantities in these divided sections are juxtaposed, and, by controlling the repetitive number of times of signal integration by the integration circuit in the first circuit means (this repetitive number of times of the signal integration is equal to the number of times for reading the outputs from the radiation sensing means), an output of a constantly stable signal level can be obtained from the first circuit means irrespective of variations in intensity of the radiation beam. Such construction provides a particularly useful gain control in case the intensity of the radiation beam to be detected is very feeble.

According to another embodiment of the present invention, there is provided the radiation beam incident position detector having a more advantageous construction, wherein, by controlling the level of the output signal from the radiation sensing means on the basis of the output from the second circuit means, an output of a constantly stable signal level can be obtained from the first circuit means irrespective of variations in intensity of the radiation beam. Such construction provides a very useful gain control not only in the case of intensity of the radiation beam to be detected being low, but also in the case of its being particulary high.

For the concrete methods of the gain control in the latter case, there may be contemplated various ways such that (1) a quantity or intensity of the incident radiation beam into the radiation sensing means is adjusted by means of, for example, a shutter, an aperture, a density variable filter, etc. on the basis of the output from the second circuit means, or (2) a rate of amplification (gain) in the amplifying circuit in the subsequent signal processing circuit, or (3) a signal integration time is controlled, when the so-called signal integration type or signal accumulation type radiation sensing means such as CCD, BBD, MOS image sensor, etc. which are capable of controlling the signal integration time is used, and various other methods. Of these various methods, the last-mentioned signal integration time controlling method is highly advantageous in that it is able to perform the gain control more satisfactorily and accurately, as is proposed in the preferred embodiment of the present invention.

It is also apparent that much more satisfactory gain control can be effected by combined use of the method of controlling the repetitive number of times of the signal integration of the integration circuit in the first circuit means and the method of controlling the output signal level from the radiation sensing means.

It is still another object of the present invention to provide an improvement in the radiation beam incident position detector, according to which the incident position of the signal radiation beam can be detected with high precision and accuracy irrespective of presence of harmful radiation such as external light, etc. which is not uniform in its intensity distribution on the plane where the signal radiation beam to be detected is impinged, by removing the influence of such harmful radiation to a satisfactory extent.

For attaining the above object, the present invention proposes the radiation beam incident position detector having a more advantageous construction, wherein, according to one preferred embodiment of the present invention to be described later, the signal radiation beam is made selectively interceptible, then a difference is found out between the signal quantities in the divided sections when the signal radiation beam is in the state of being intercepted and the signal quantities in the divided sections when the signal radiation beam is in the state of being impinged, and, by comparing the differential signals as found, the position of the center or the center of gravity of the signal radiation beam is detected, while effectively removing the influence due to the abovementioned harmful radiation.

To explain the above more understandably, when, for example, the time-sequential output signals from the radiation sensing means are divided into two sections of A and B having the same size, and the position of the center or the center of gravity of the signal radiation beam is to be detected on the incident surface of the radiation with a position corresponding to the split point of the sections A and B as a reference, comparison is performed between $|A_1-A_2|$ and $|B_1-B_2|$, with respect to the signal quantities $A_1$ and $B_1$ in the abovementioned sections A and B where the signal radiation beam is intercepted and the harmful radiation along is present as well as the signal quantities $A_2$ and $B_2$ in the sections A and B where the signal radiation beam is being projected, whereby the influence due to the harmful radiation which is non-uniform in its intensity distribution can be satisfactorily eliminated.

The circuit for carrying out such processing method can take various constructions. For instance, as disclosed in the preferred embodiment of the invention, the circuit construction, wherein the signal polarity reversing circuit and the integration circuit are used in combination, as mentioned in the foregoing, to perform the operation of $(A_1-B_1-A_2+B_2)$ at the time of reading outputs from the abovementioned radiation sensing means for two times in all, one corresponding to a state where the signal radiation beam is intercepted, and the other corresponding to a state where the signal radiation beam is not intercepted, and the signal processing method using such circuit construction are highly advantageous in that they are very simple in construction and easy in controlling. Needless to say, other circuit constructions and signal processing methods may be adopted for the purpose of the present invention.

Incidentally, if the intensity distribution of the abovementioned harmful radiation is uniform, influence of such harmful radiation can be sufficiently eliminated by the simple operation of $(A_2-B_2)$. However, if the intensity distribution is not uniform, the abovementioned simple operation of $(A_2-B_2)$ does not suffice to eliminate the influence of the harmful radiation, because the quantity of the noise signal component derived from the harmful radiation contained in each of the signal quantities $A_2$ and $B_2$ is unequal. In this respect, therefore, the signal processing method by the abovementioned operation of $(A_1-B_1-A_2+B_2)$ is extremely effective for perfect removal of the influence due the harmful radiation, the intensity distribution of which is non-uniform.

It is yet another object of the present invention to provide a more advantageous construction of active type focus detecting device, in particular, a TTL type active focus detecting device, wherein the radiation incident position detector having the aforedescribed various characteristics is incorporated either individually or in combination.

The foregoing objects, other objects as well as characteristic features and specific constructions of the present invention will become more apparent from the following detailed description thereof, when taken in conjunction with the accompanying drawing.

BRIEF DESCRIPTION OF THE ACCOMPANYING DRAWING

FIGS. 1A, 1B, and 1C are respectively schematic diagrams showing optical layouts of a TTL type active focus detection device as one applicable example of the radiation beam incident position detector according to the present invention, wherein FIG. 1A shows a state of far focus, FIG. 1B shows a state of in-focus, and FIG. 1C shows a state of near focus;

FIGS. 2A, 2B and 2C are respectively graphical representations to explain the principle of the radiation beam incident position detection, when the device according to the present invention is applied to the focus detecting device as shown in FIGS. 1A through 1C, wherein FIG. 2A shows the state of distribution of each radiation energy corresponding to each state in FIGS. 1A, 1B, and 1C on the radiation receiving surface of the sensor array device, FIG. 2B shows a timing relationship of the reverse integration of the output from the sensor device, and FIG. 2C shows the modes of the reverse integration;

Figure 4:
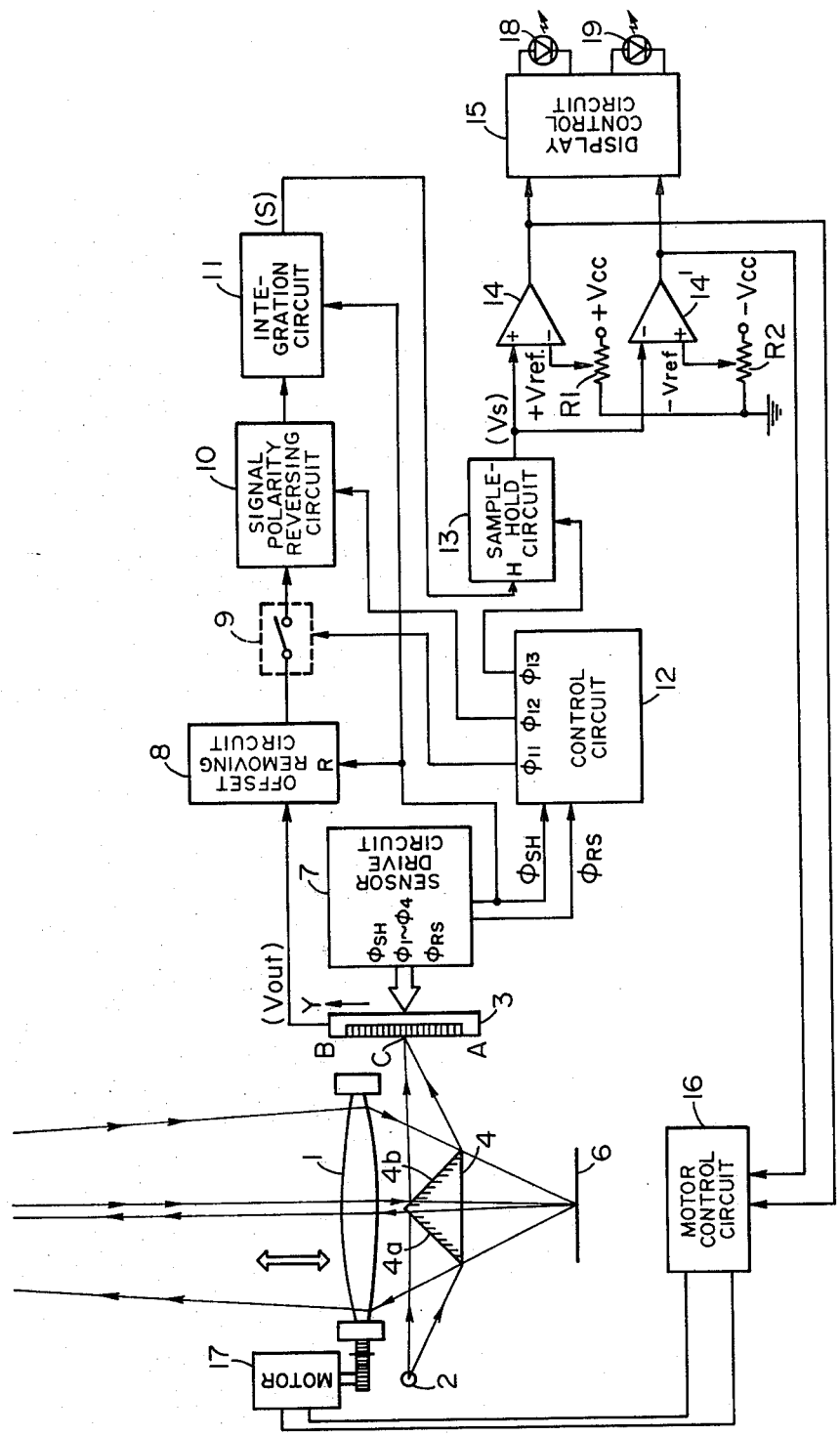
FIG. 4 is a block diagram showing one embodiment, when it is used in the focus detecting device shown in FIGS. 1A through 1C.
Figure 9A:
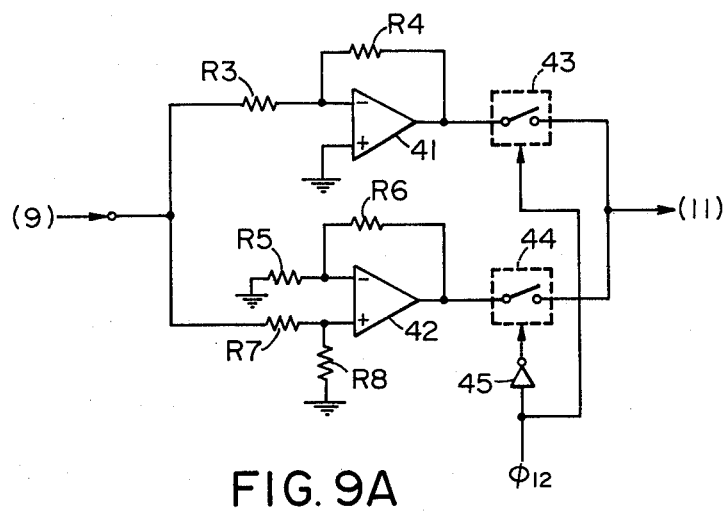
Figure 9B:
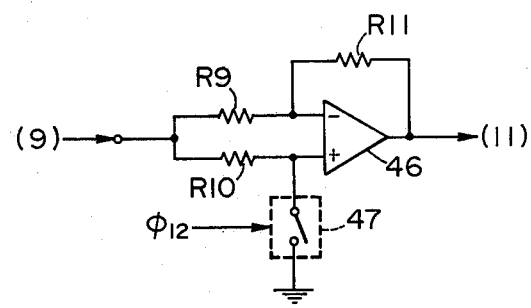
Figure 9C:
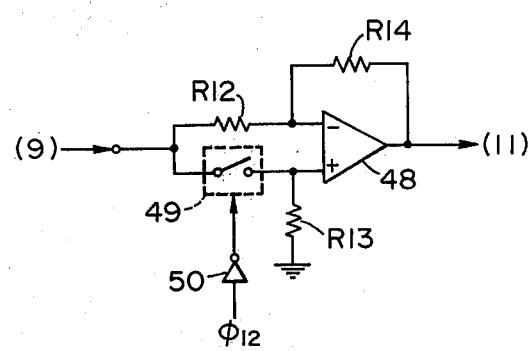
Figure 10:
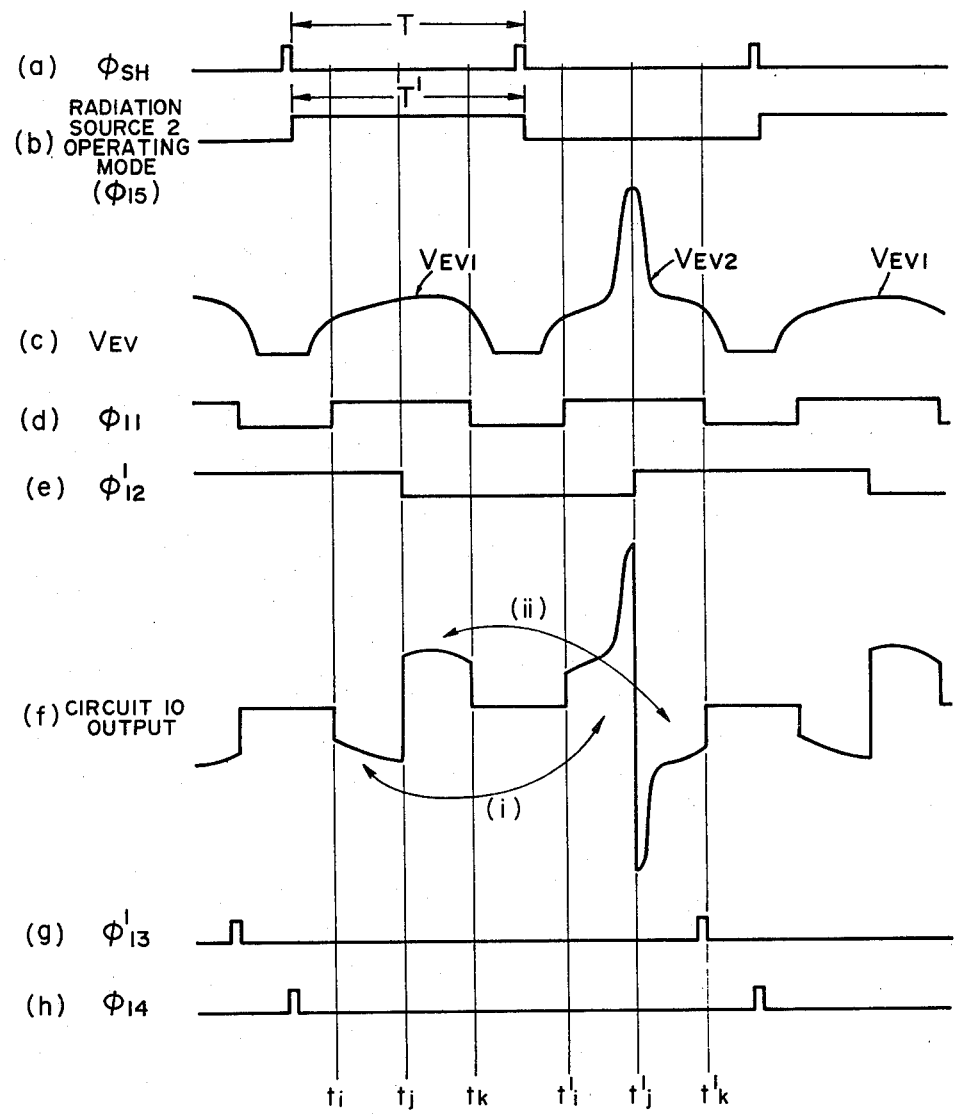
Figure 11:
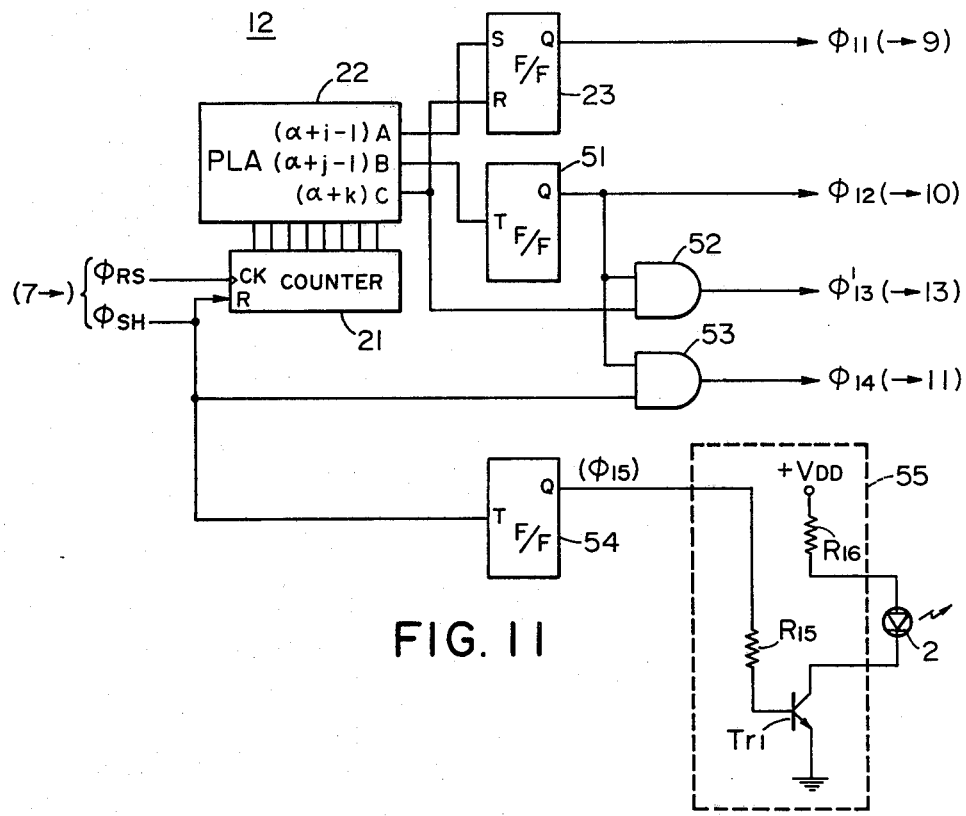
Figure 12:
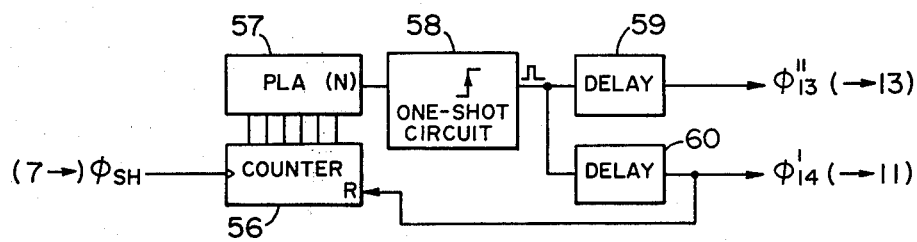
Figure 13:
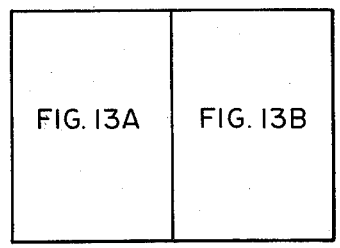
Figure 13A:
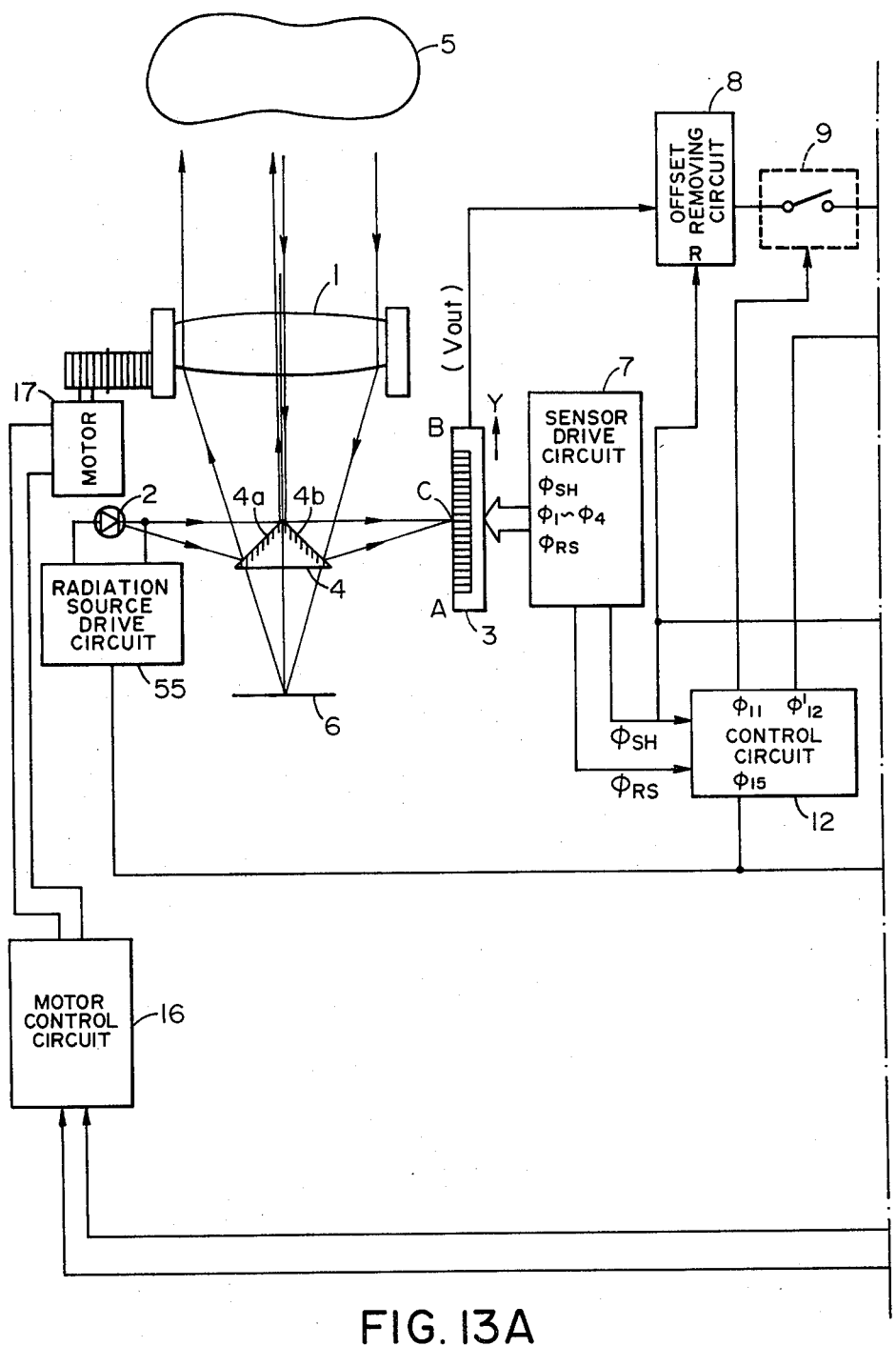
Figure 13B:
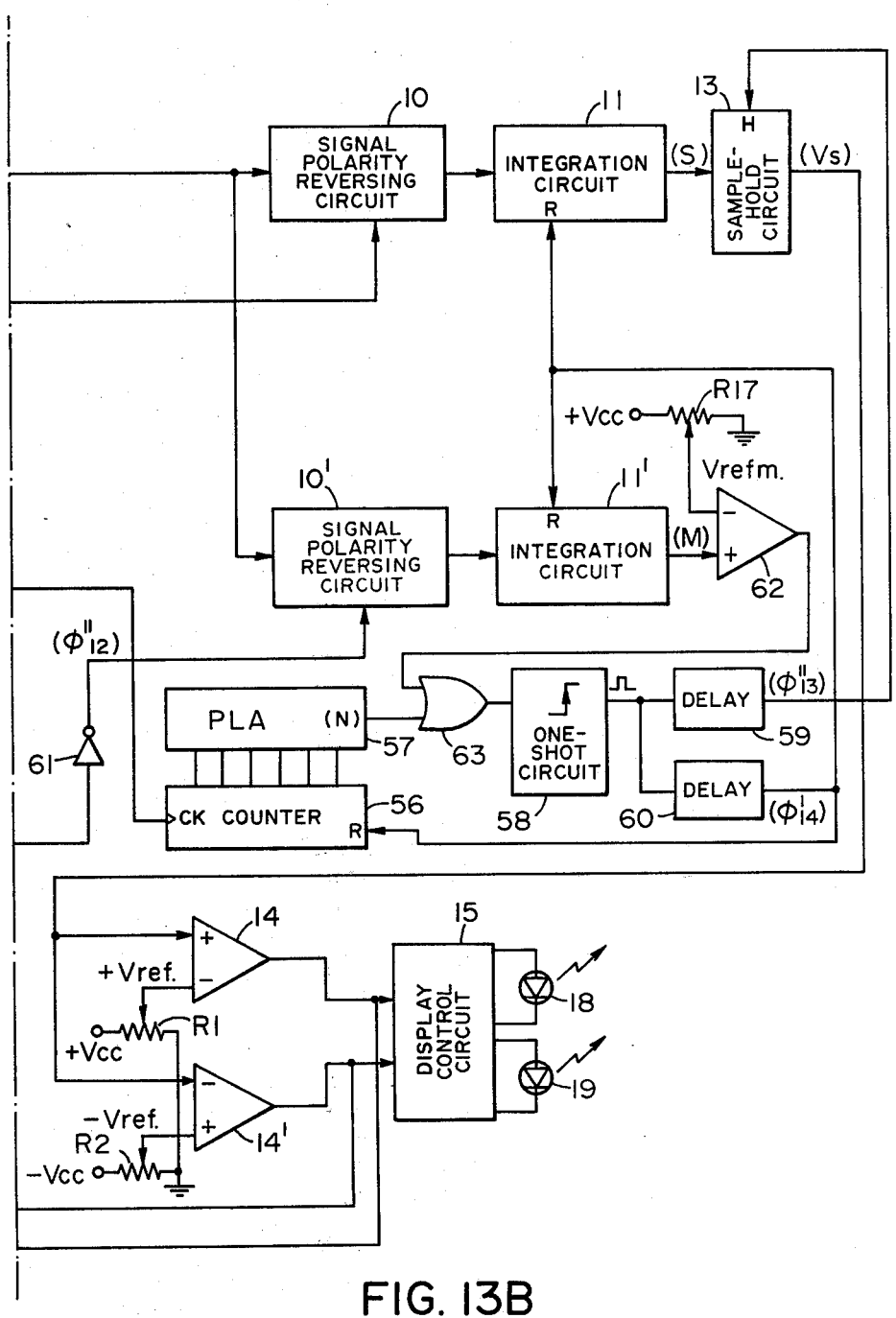
Figure 14:
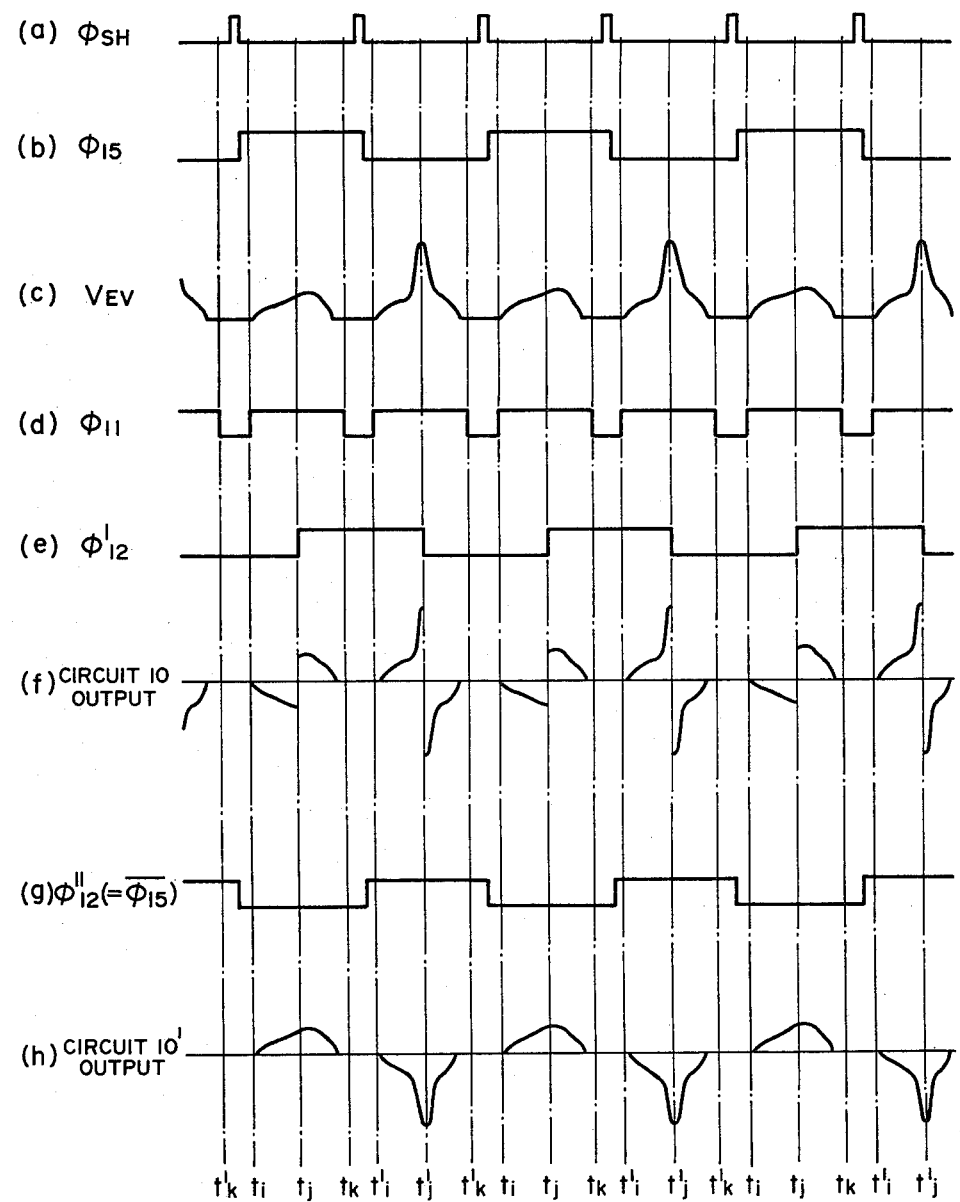
Figure 15:
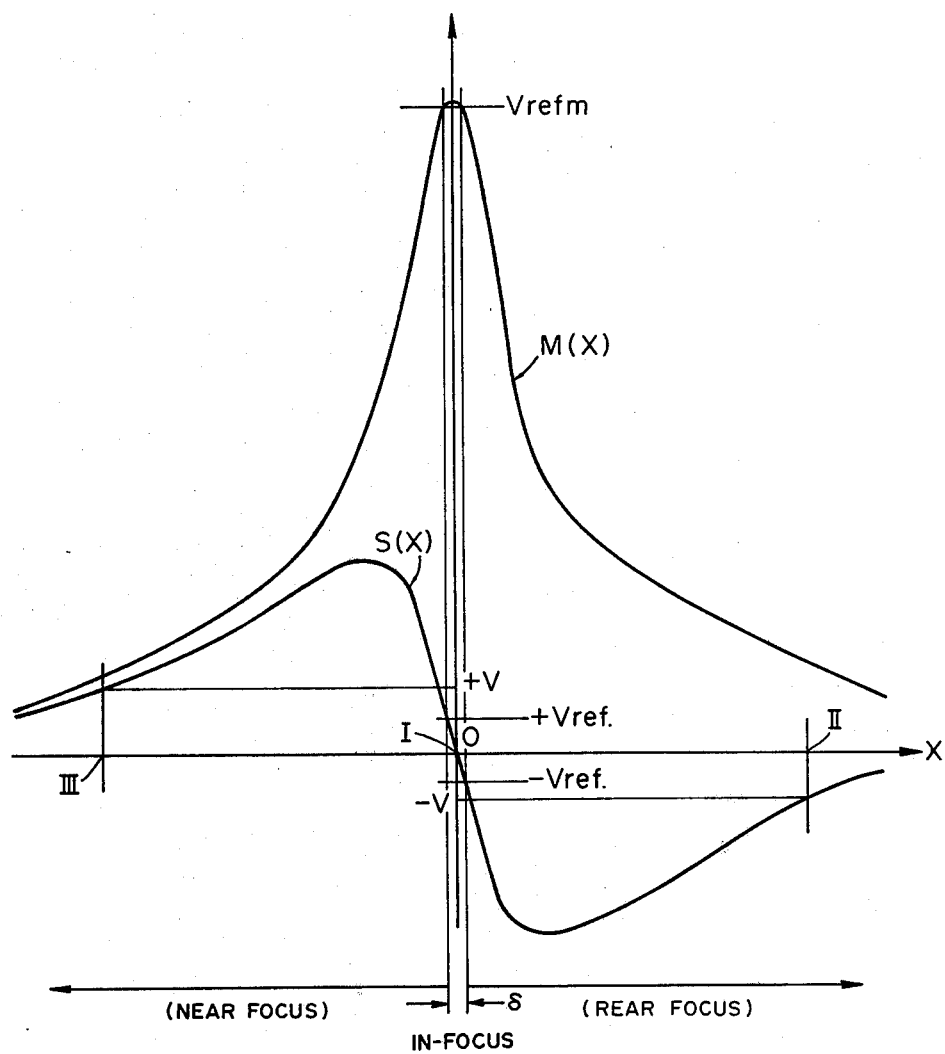
Figure 16:
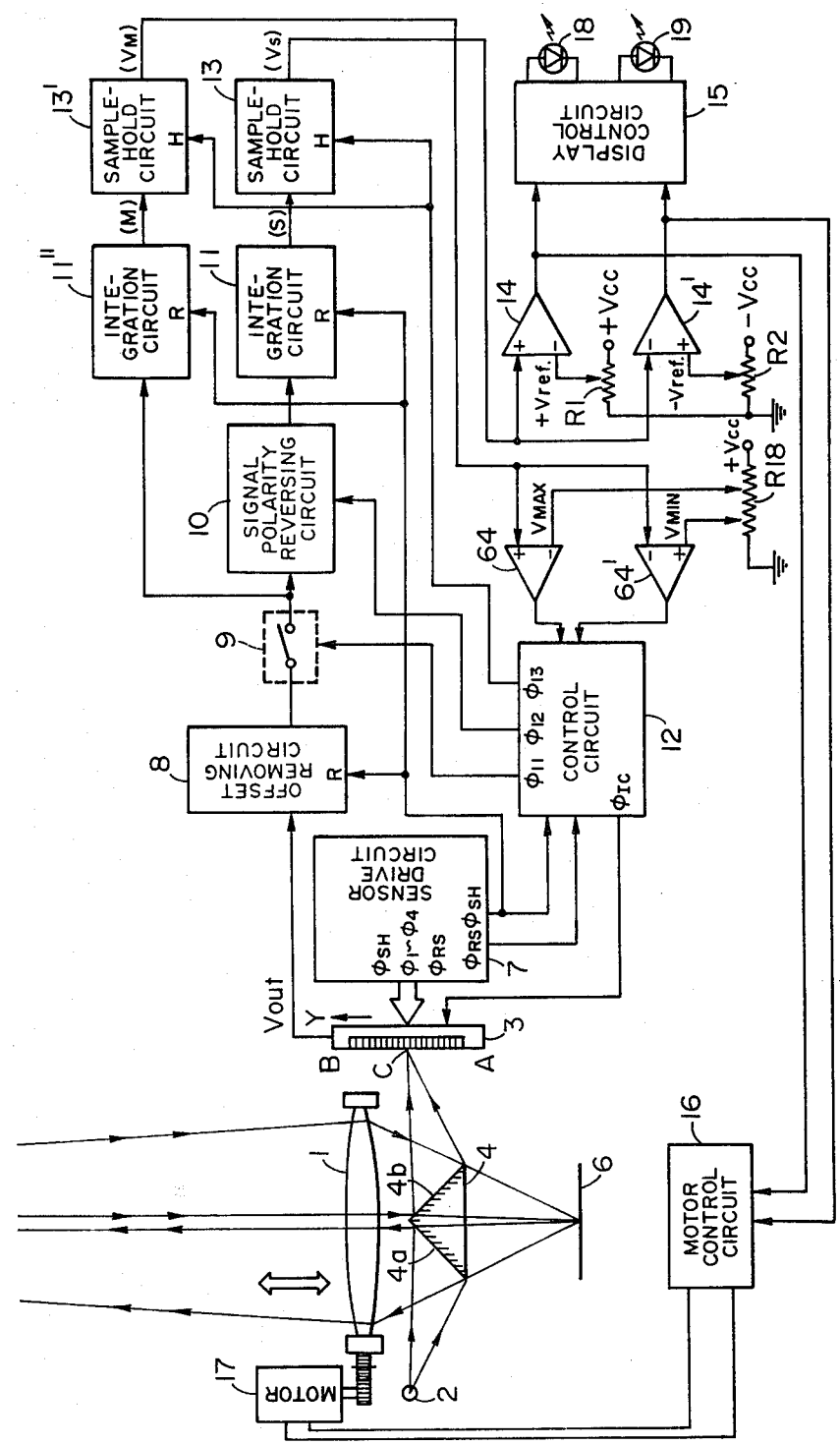
Figure 17:
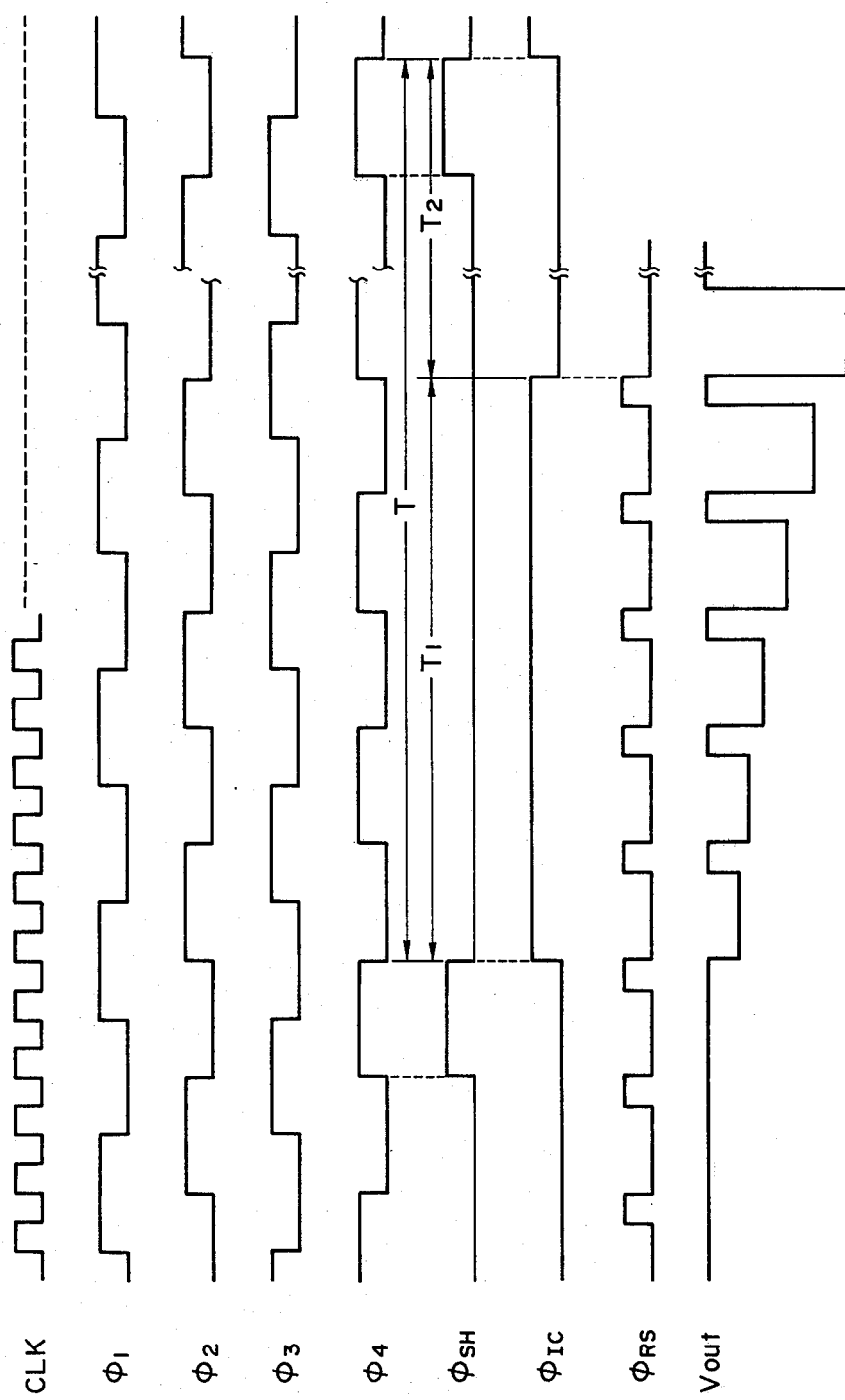
Figure 18:
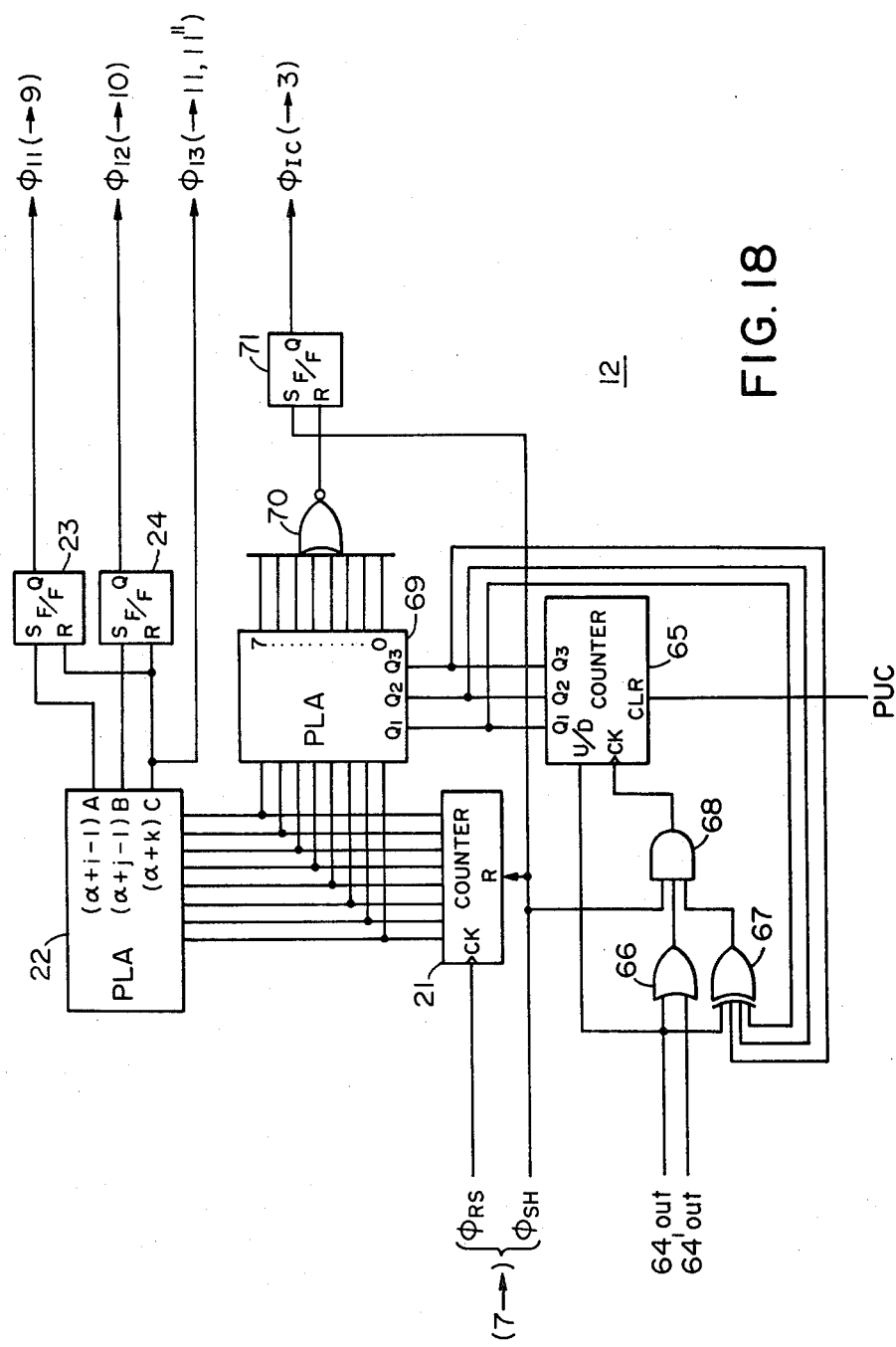
Figure 20A:
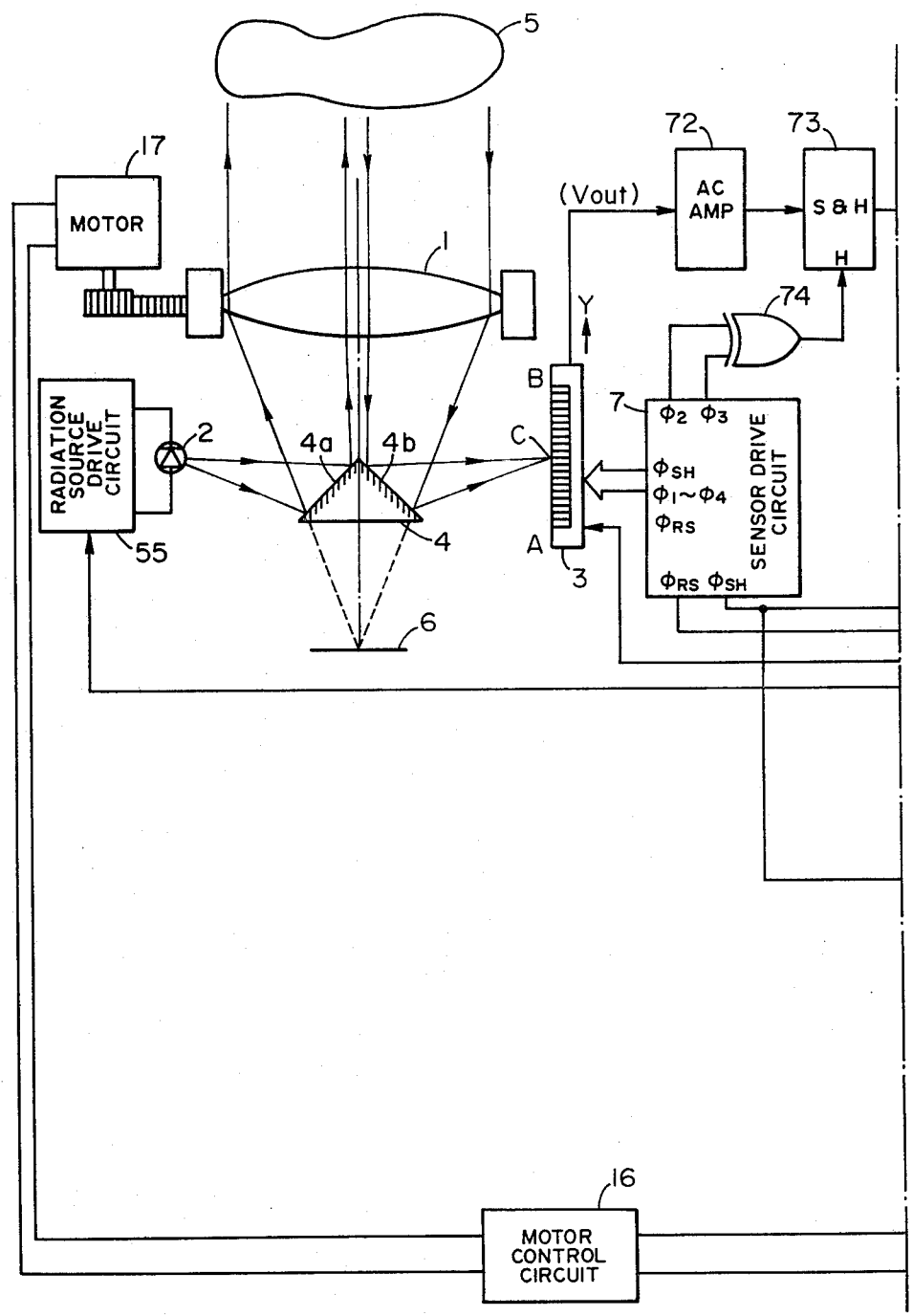
Figure 20B:
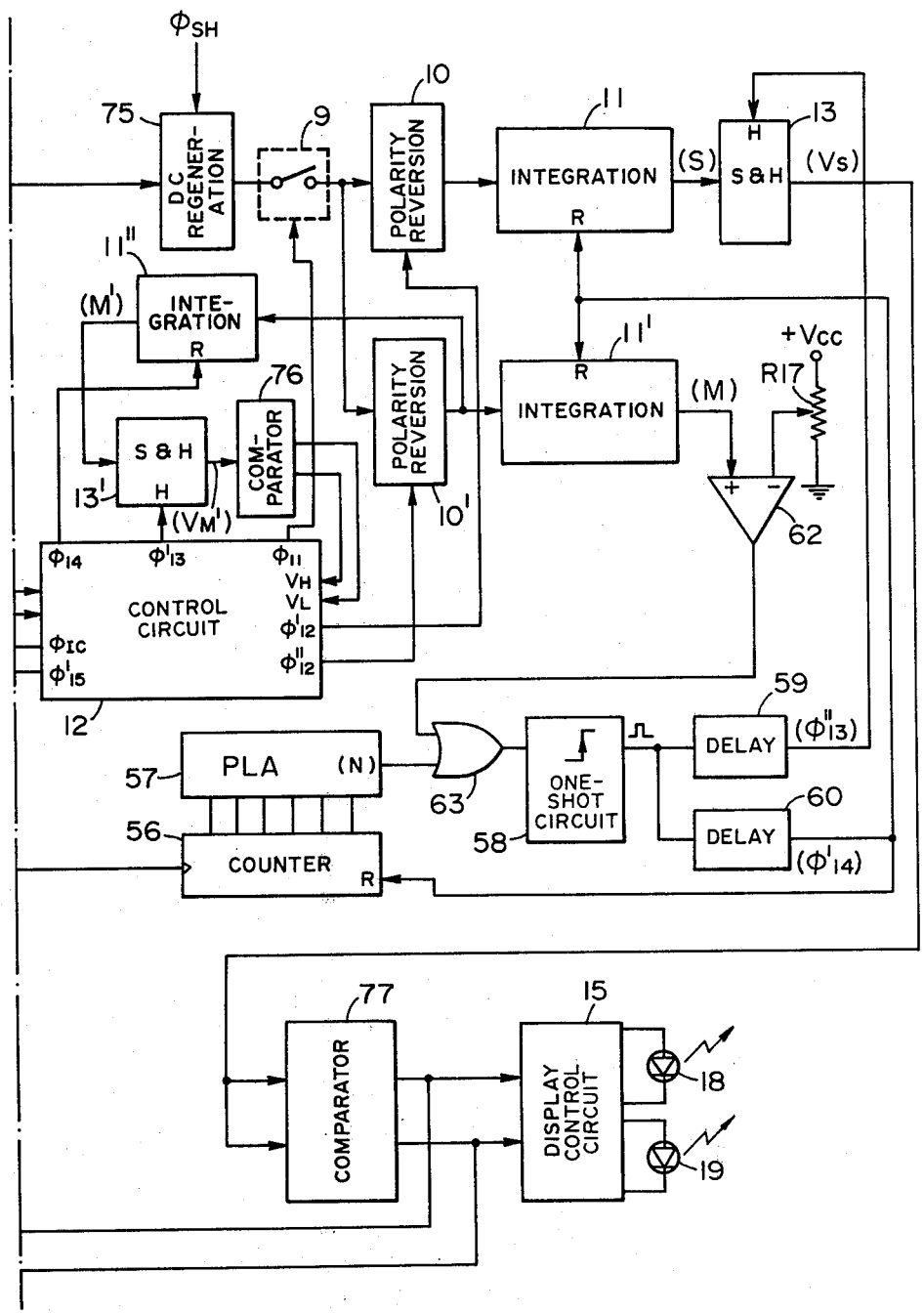
Figure 21:
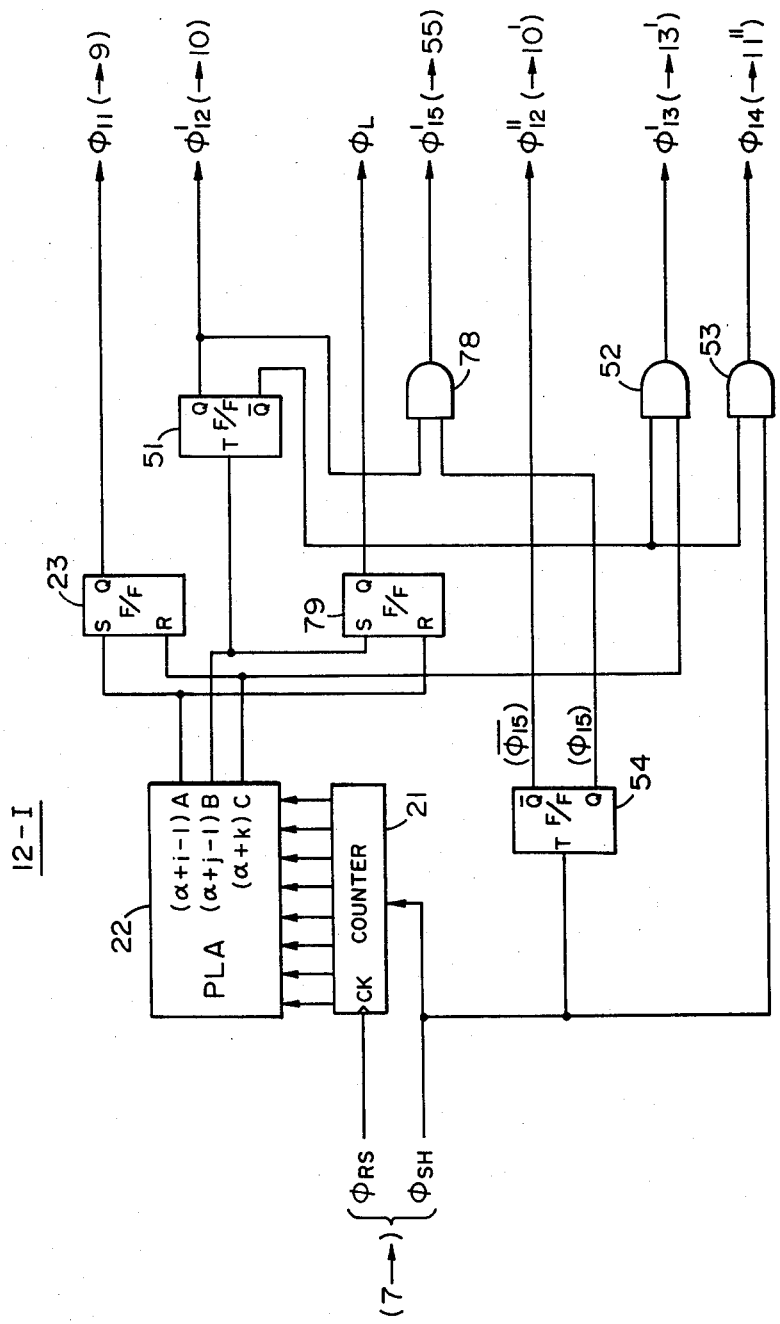
Figure 22:
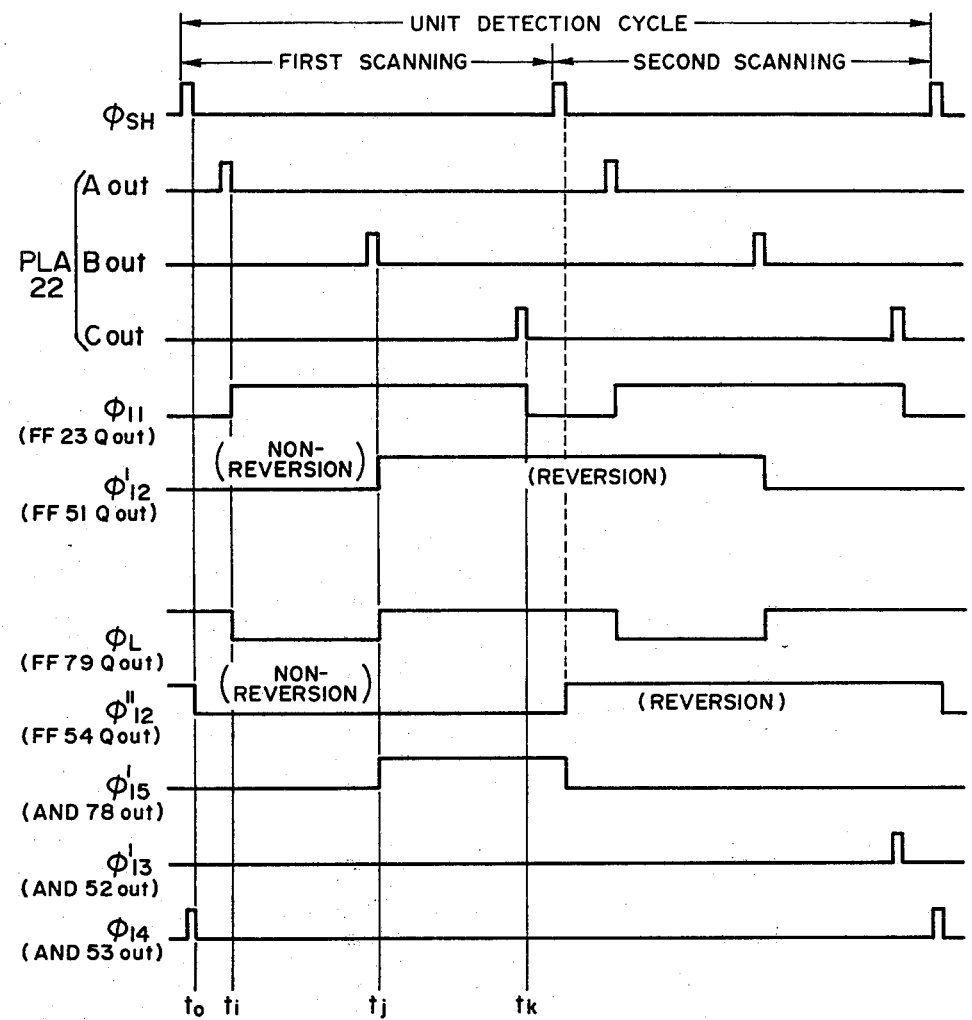
Figure 23:
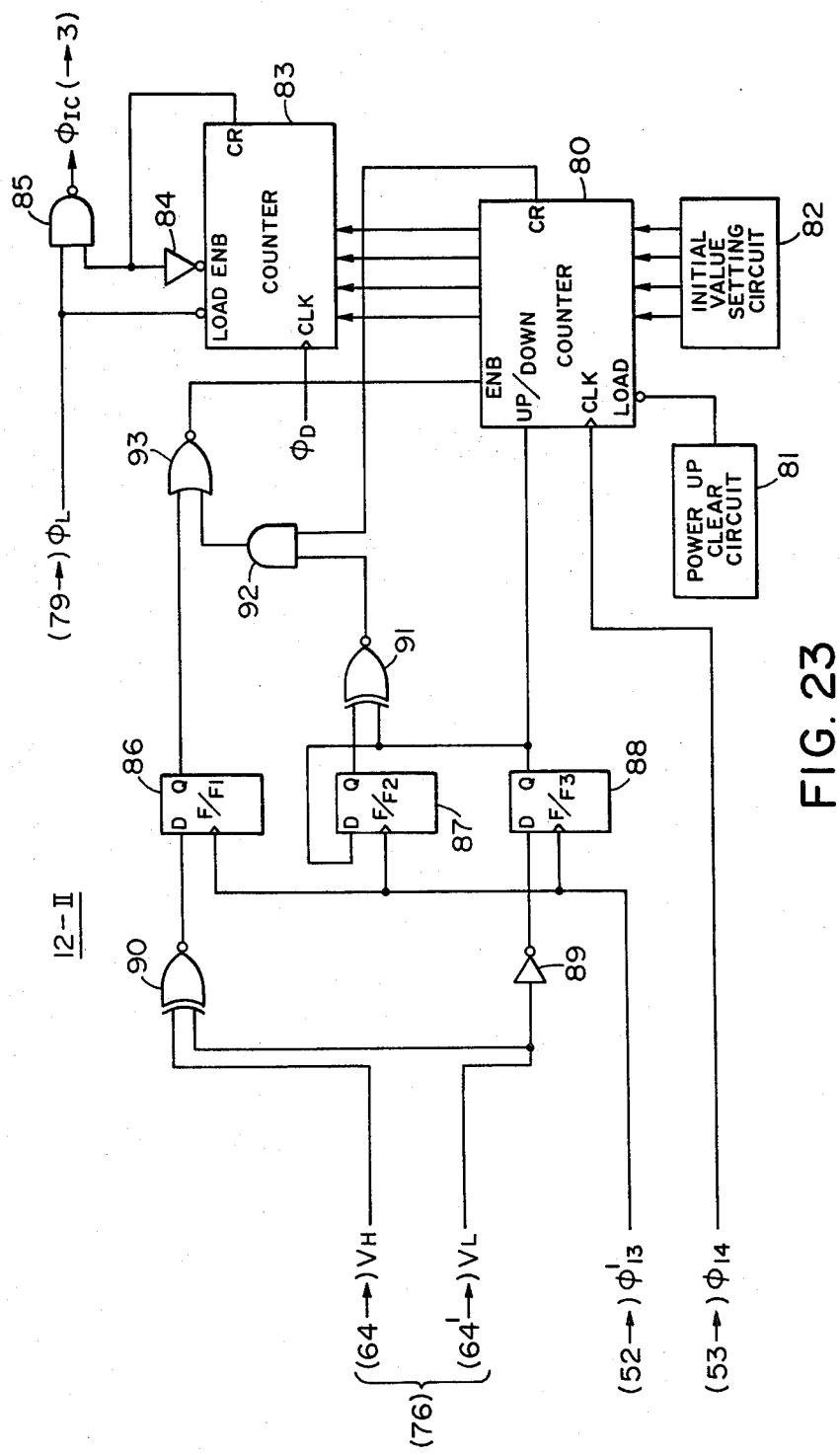
Figure 24:
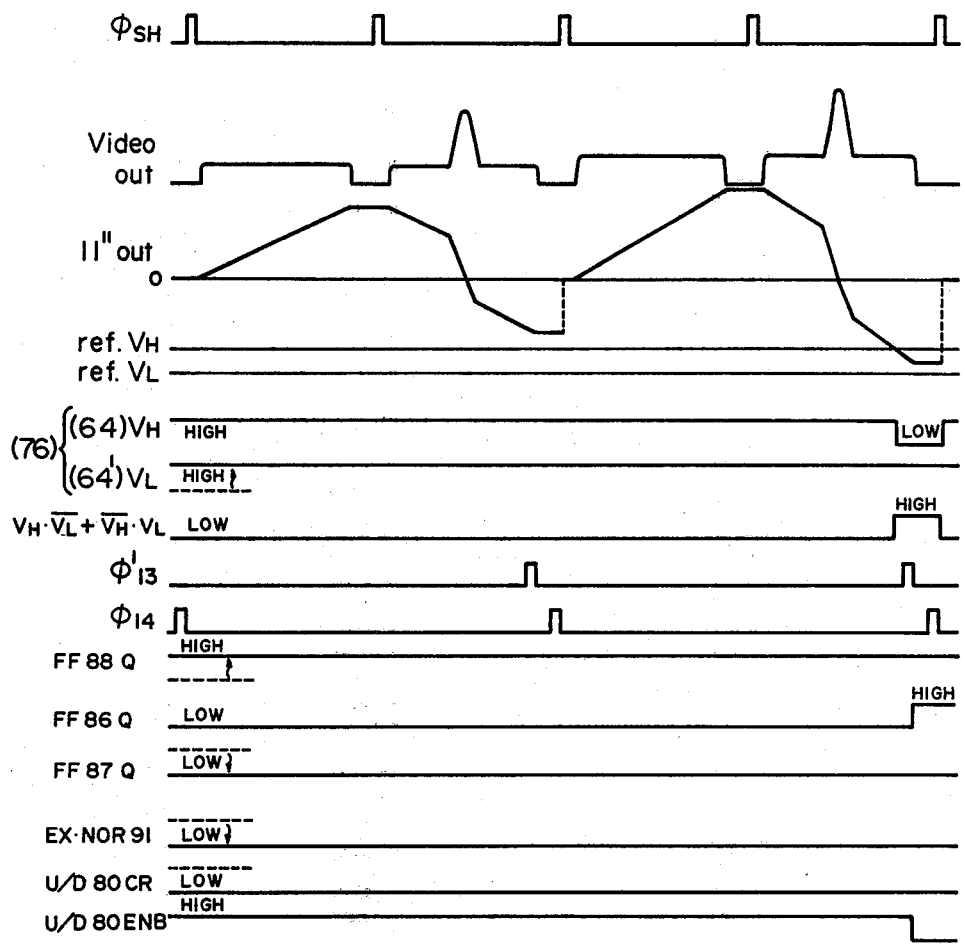
Figure 25:
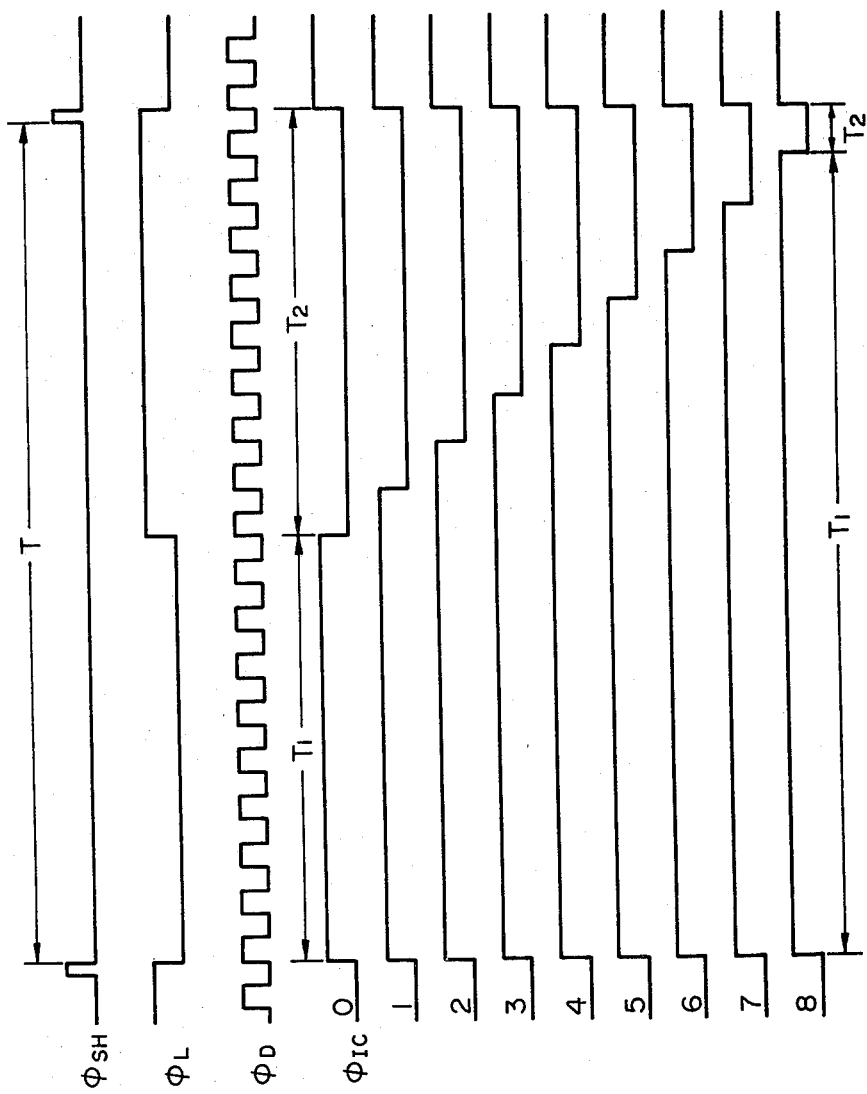
Figure 26:
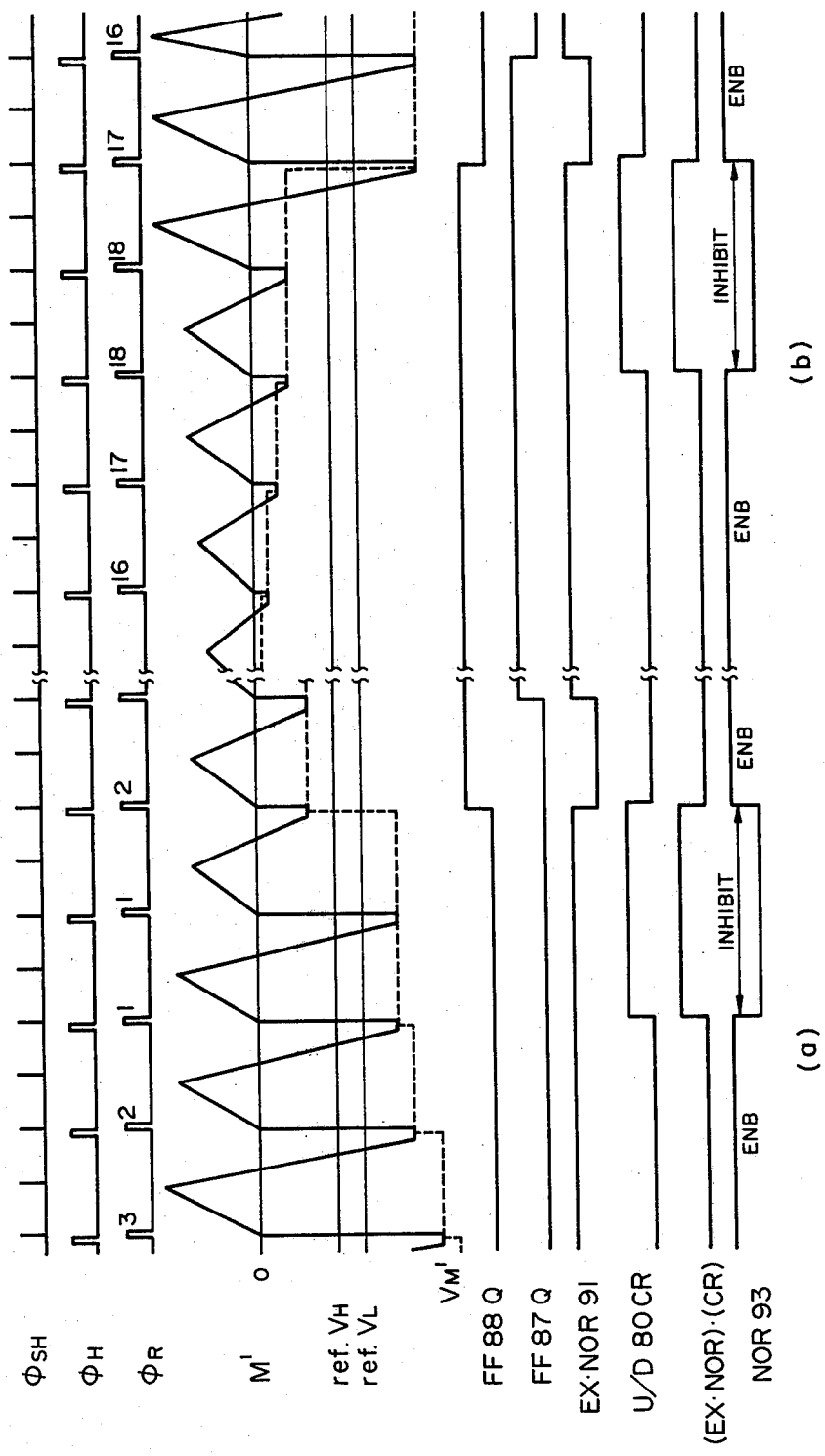

FIGS. 9A, 9B, and 9C are respectively partial circuit diagrams showing three embodimental constructions of the signal polarity reversing circuits in the circuit system in FIG. 4;

FIG. 10 is a signal waveform diagram for explaining one modified embodiment from that shown in FIG. 4;

FIG. 11 is a block diagram principally showing a construction of the control circuit in the circuit system shown in FIG. 4 which is necessary for practicing the modification as explained in FIG. 10 above;

FIG. 12 is also a block diagram showing a construction of an additional circuit necessary for other modification from the embodiments as explained in FIGS. 4 through 11;

FIG. 13 shows the relative position of FIGS. 13A and 13B;

FIGS. 13A and 13B together are block diagrams showing further modification from the embodiments as explained in FIGS. 4 through 12;

FIG. 14 is output waveform diagrams showing the relationship in the outputs from various principal circuit components in the circuit system of FIGS. 13A and 13B;

FIG. 15 is an output waveform diagram for explaining a reference voltage level used in the circuit system shown in FIGS. 13A and 13B;

FIG. 16 is a block diagram showing still further modification from the embodiment in FIG. 4;

FIG. 17 is a timing chart showing an output from the sensor driver and output signals from the sensor array device based on the output from the sensor driver;

FIG. 18 is a block diagram showing one embodimental construction of the control circuit in the circuit system of FIG. 16;

FIG. 19 is a timing chart showing operating relationship of the circuit shown in FIG. 18;

FIG. 20 shows the relative positions of FIGS. 20A and 20B;

FIGS. 20A and 20B together are block diagrams showing one embodiment, in which all the improvements as explained in FIGS. 10 through 19 have been incorporated in the embodimental construction shown in FIG. 4;

FIG. 21 is a block diagram showing one embodimental construction of the control circuit, mainly the sequence control section, in the circuit system of FIGS. 20A and 20B;

FIG. 22 is a timing chart showing operating relationship in the circuit of FIG. 21;

FIG. 23 is a block diagram showing one embodimental construction of the control circuit, mainly a scanning signal control section, in the circuit system of FIGS. 20A and 20B;

FIG. 24 is a timing chart showing an operating relationship in the circuit of FIG. 23;

FIG. 25 is a timing chart showing electric discharging time (charge accumulating time) of the sensor array device obtained by the circuit of FIG. 23; and FIG. 26 is a timing chart showing an operating model of the circuit of FIG. 23.

DETAILED DESCRIPTION OF PREFERRED EMBODIMENTS

Figure 1A:
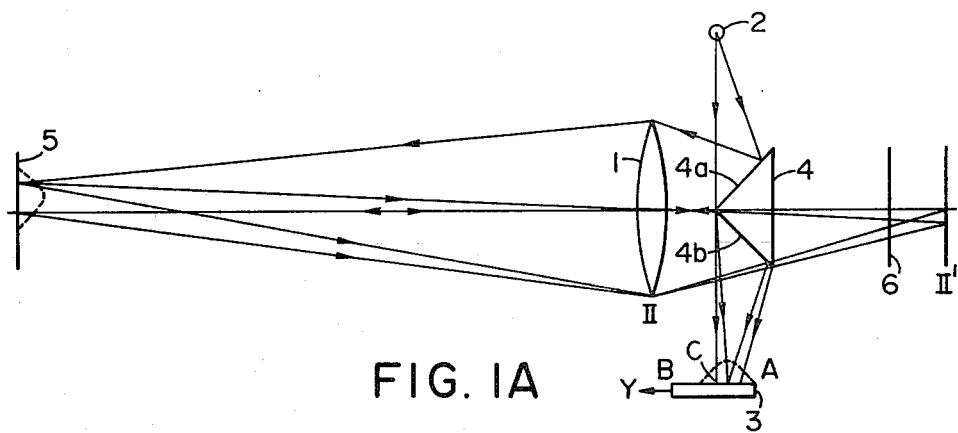
Figure 1B:
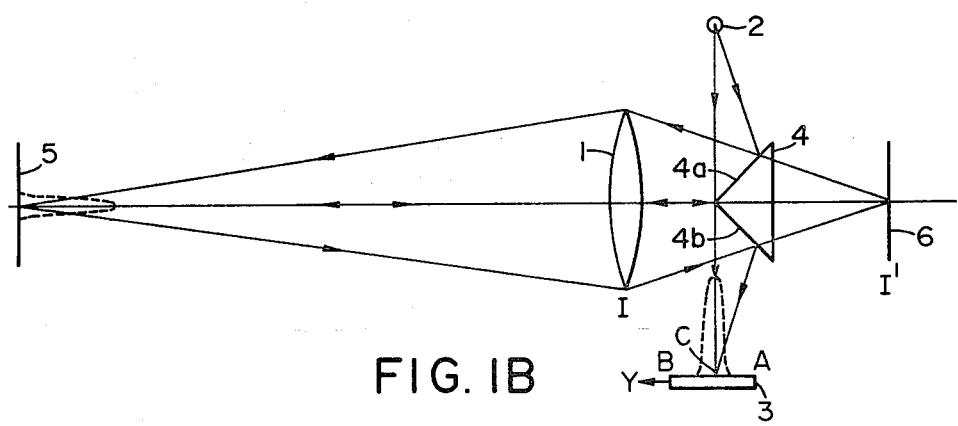
Figure 1C:
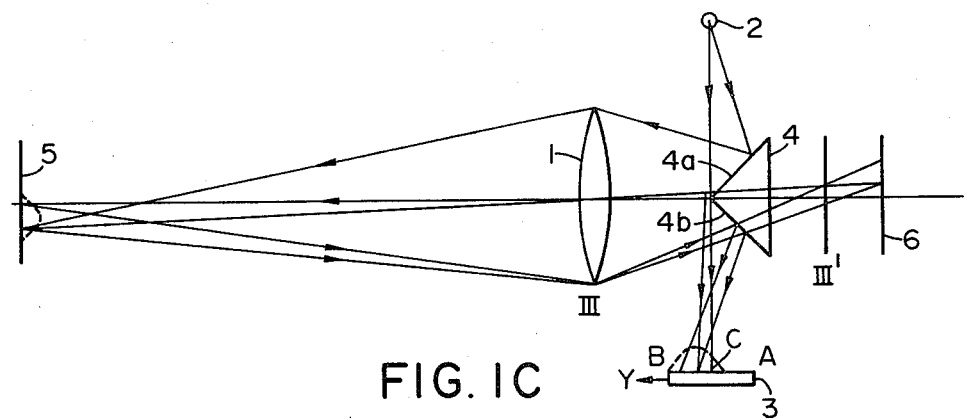

Referring now to FIGS. 1A through 1C showing an optical layout of a TTL type active focus detecting device relative to the aforementioned U.S. patent application Ser. No. 43,250, as one example of the application of the radiation beam incident position detector according to the present invention, a reference numeral 1 designates an image forming lens, 6 a predetermined focal plane thereof (i.e., a film surface in a camera), 5 a surface of an object, 2 a radiation source constructed with various means such as an LED (IRED-Infrared Emitting Diode) which emits infrared or near infrared ray, etc., a semiconductor laser diode, and others, 3 a self-scanning type sensor array device (self-scanning type solid-state image sensor) such as CCD, BBD, MOS-photodiode array (MOS image sensor), each having a plurality of linearly arranged sensor elements, or CCD photodiode, and others, as a scanning type radiation sensing means, and 4 a prism having reflecting surfaces 4a and 4b.

In such optical layout, the radiation beam emitted from the radiation source 2 is reflected by the reflecting surface 4a of the prism 4, and, after it passes through a predetermined imaginary opening in the image forming lens 1, projects a spot image of the radiation source 2 on the object surface 5. Here, the radiation source 2 is disposed at a position conjugative with a predetermined position on the predetermined focal plane 6. Such conjugative arrangement also applies to the sensor array device. The radiation beam reflected by the object surface 5 passes through the imaginary opening in the image forming lens 1, corresponding to the reflecting surface 4b of the prism, and projects a spot image by the radiation source 2 on the radiation receiving surface of the sensor array device 3.

In the following, explanations will be given as to the difference in FIGS. 1A, 1B, and 1C. At first, a position I of the image forming lens 1 shown in FIG. 1B is assumed to be the "in-focus" state to the object surface 5. At a position II shown in FIG. 1A, which is in the "far focus" state, the lens 1 is positioned behind the position I in FIG. 1B. In such state, the spot image projected onto the object surface 5 is focused on the surface 5 in a state of being blurred and deviated from its center. In FIG. 1A, a position II' is such one that the spot image on the object surface 5 at that time is focused by the image forming lens 1 at the position II in its clearest state. The radiation beam which is projected in a manner to be converged to the position II' in the clearest or sharpest state is reflected by the reflecting surface 4b of the prism 4, and is focused on the radiation beam receiving plane of the sensor array device in a state of its being blurred and also deviated from its center C to the side A. At a position III shown in FIG. 1C, which is in the "near focus" state, the lens 1 is positioned in front of the position I in FIG. 1B. In such state, the spot image projected on the object surface 5 is focused on the object surface 5 in a state of its being blurred and deviated from its center. A position III' in FIG. 1C is such one where the spot image on the object surface 5 at that time is focused in its clearest state by the image forming lens 1 at the position III. The radiation beam which is projected in a manner to be converged on the position III' in the sharpest state is reflected by the reflecting surface 4b of the prism 4, and is focused on the radiation receiving plane of the sensor array device 3 in a state of being blurred and also deviated from its center C to the side B. In FIG. 1B, I' refers to a position where the spot image on the object surface 5 at this time is focused in the clearest state by the image forming lens 1 in its in-focus state. The radiation beam which is projected in a manner to be converged on this position I' in the sharpest state is reflected by the reflecting surface 4b of the prism 4, and is focused on the radiation receiving plane of the sensor array device 3 in the sharpest state and in substantial coincidence with the center C. In FIGS. 1A, 1B and 1C, the radiation intensity distribution of the projected spot image on the object surface 5 and the radiation receiving plane of the sensor array device 3 is diagrammatically indicated by a dotted line. By thus unevenly distributing these two imaginary openings for radiation projection and radiation receiving in the image forming lens 1, the spot image focused on the conjugative point in the in-focus state of the image forming lens 1 as shown in FIG. 1B is deviated mutually in the opposite direction, while becoming blurred in correspondence to the adjusted state (far focus or near focus state) of the image forming lens 1 shown in FIGS. 1A and 1C. Accordingly, by detecting the position of the abovementioned spot image, i.e., the position of the reflected radiation beam from the object surface 5 on the radiation receiving surface of the sensor array device 3 (in particular, a relative positional relationship with respect to the center C), each state of the near focus and the far focus can be discriminated. In the drawing, an arrow mark Y indicates the reading direction of the output from the sensor device.

Figure 2A:
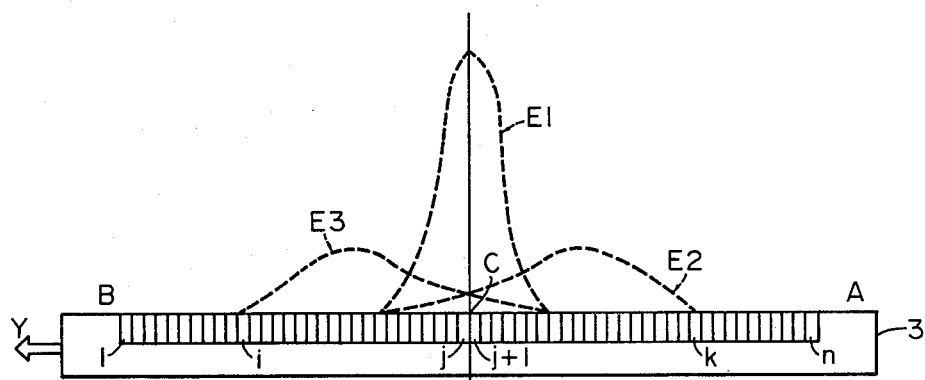
Figure 2B:
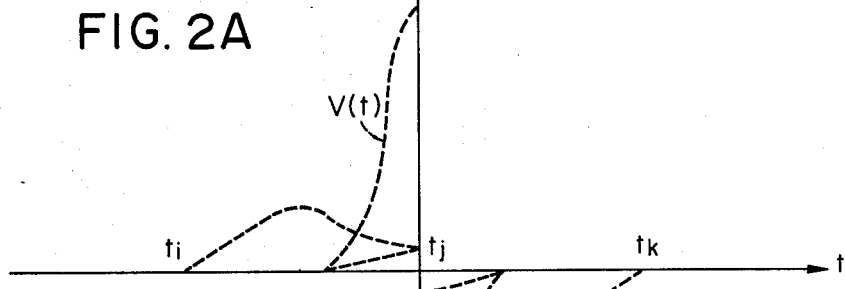
Figure 2C:
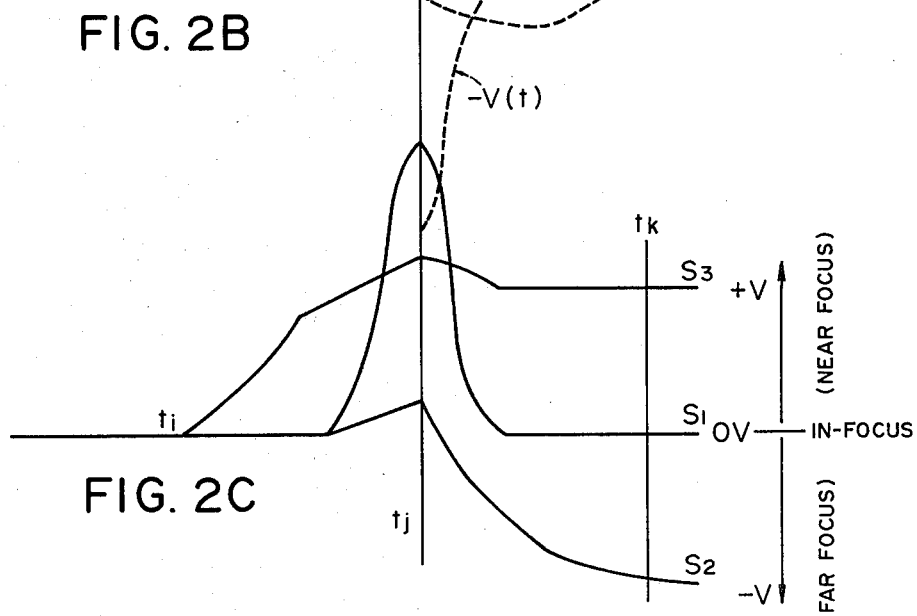

Referring now to FIGS. 2A through 2C, explanations will be given as to the principle of detecting the radiation beam incident position, when the detector according to the present invention is applied to the TTL type active focus detecting device as has been explained in reference to FIGS. 1A through 1C. FIG. 2A diagrammatically shows the energy distribution of the radiation beam on the radiation receiving surface of the sensor array device 3, wherein $E_1$ refers to a distribution in the in-focus state which corresponds to the sharpest image forming state in FIG. 1B. It should be noted here that a reference point for detecting the incident position of the radiation beam on the radiation receiving surface of the sensor array device 3 is selected at a point C which is conjugative with the center of the radiation source 2, and this conjugative point C has been pre-selected, in this case, at a boundary between a j'th sensor element and a J+1st sensor element. Accordingly, in the in-focus state, the energy distribution of the radiation beam on the radiation receiving plane of the sensor array device 3 is substantially equally divided to both left and right sides on the march of this conjugative point C. In this state of division, the total energy quantity of the radiation to be projected into the i'th to j'th sensor elements on the radiation receiving plane of the sensor array device 3 and the total energy quantity of the radiation to be projected into the j+1st to k'th sensor elements (provided that $j-i=k-(j+l)$) are mutually equal within a range of a predetermined error.

The energy distribution states $E_2$ and $E_3$ of the radiation beam indicate the states shown in FIGS. 1A and 1C, respectively, i.e., the energy distribution states of the radiation beam on the radiation receiving plane of the sensor array device 3 in the far focus state and the near focus state. The energy distribution of the radiation beam deviates in either the left (side B) or the right (side A) direction on the radiation receiving plane of the sensor array device 3, while becoming blurred, according as the image forming lens 1 is away from the position I in its in-focus state to the front or rear side. In this case, the maximum forwarding quantity of the image forming lens 1 and the maximum deviation quantity of the spot image on the radiation receiving plane of the sensor array device 3 are in the mutually corresponding relationship, from which a sensor length, i.e., the number of the sensor elements in the sensor array device 3 can be determined. In this instance, there is not so much practical inconvenience as to be noticeable, even if the sensor length cannot be made so long, hence the maximum deviation quantity of the spot image cannot be perfectly covered, whereby the energy distributions $E_2$ and $E_3$ corresponding to the near focus and the far focus, respectively, are brought to its maximum blurred condition (i.e., maximum diverged state), and the left or right end of the energy distribution is retrenched. In FIG. 2A, the boundary of the sensor elements corresponding to this left and right ends are indicated by "i" and "k". In the present invention, of the signals of the sensor elements which are time-sequentially forwarded from the sensor array device 3, the signals for the elements "i" to "k" are sequentially integrated, and the signals for the elements "i" to "j" and those for the elements "j+1" to "k" are subjected to the polarity reversing and integration between the element "j" and the element "j+1". In other words, when the signal corresponding to the energy distribution is denoted by V(t) and the gain of the integrator is represented by K, an integrated value S can be expressed by the following equation (1).

$$S = K \left[ \int_{t_i}^{t_j} V(t)dt - \int_{t_j}^{t_k} V(t)dt \right] \quad (1)$$

(K is a constant to be determined by gain of the integration circuit, etc.)

FIG. 2B, diagrammatically indicates the signal V(t) which has been polarity-reversed by a time tj. Also, FIG. 2C diagrammatically shows the integration output to be obtained when each signal in FIG. 2B is integrated for each state of the energy distributions, i.e., for each of the energy distributions $E_1$, $E_2$ and $E_3$ in each of the focus states. As the result of being reversed and integrated by a time tj, a difference S between an integrated value in the time section of from ti to tj and the integrated value in the time section of from tj to tk is produced as an output with lapse of the time tk, as will be understandable from the above equation (1). When this difference S is zero, as shown by $S_1$ in FIG. 2C, it denotes a state, wherein the image forming has been effected in such a manner that the energy distribution becomes equal between the left and right sides with the conjugative point C established on the radiation receiving plane of the sensor array device 3 as its center, which state corresponds to the in-focus state in FIG. 1B, and also to the state of the energy distribution $E_1$ in FIG. 2A where the portion of the sensor array device 3 is shown in an enlarged scale. Further, $S_2$ and $S_3$ in FIG. 2C correspond respectively to the energy distribution $E_2$ and $E_3$ on the radiation receiving surface of the sensor array device 3. That is, speaking of $S_2$, a difference between the integration of the signal envelope corresponding to the energy distribution on the sensor elements "i" to "j" and the integration of the signal envelope corresponding to the energy distribution on the sensor elements "j+1" to "k" is produced as an output $-V$ with lapse of the time tk, as the result of reversing and integration during the time tj, at the right end of the curve $S_2$ in FIG. 2C. Similarly, an output $+V$ is produced for $S_3$. In this manner, the energy distribution of the signal radiation beam on the radiation receiving surface of the sensor array device 3 moves to the left or right with the conjugative point C as the center, while accompanying blurring, in accordance with degree of deviation in the back and forth direction of the image forming lens 1 from its in-focus position to a certain object to be detected. A level of an integration output immediately after lapse of the time tk which corresponds to movement of the lens, as shown in FIG. 2C, i.e., changes in the level of the output S after the polarity reversing and integration as represented by the equation (1), will be shown by a curve in FIG. 3. The graphical representation diagrammatically indicates a curve of $S=S(X)$ by taking the value of S represented in the equation (1) in the ordinate (denoted as S-axis in the graph) and the quantity of deviation of the image forming lens 1 from its in-focus position in the abscissa (denoted as X-axis in the graph). A point where the curve S(X) intersects the X-axis, i.e., $S(X)=0$, denotes the in-focus state. Since the curve S(X) is substantially in a point-symmetry with the original point as the center, when the polarity of S(X) and the position X of the image forming lens 1 satisfying the relationship of $S(X)=0$ are found, distinction among the in-focus state, the near focus state, and the far focus state can be detected. For example, the positions II, I, and III in FIG. 3 respectively correspond to the image forming lens positions II, I, and III in FIGS. 1A, 1B, and 1C, the value of each S(X) corresponding to the quantity of deviation.

Figure 5:
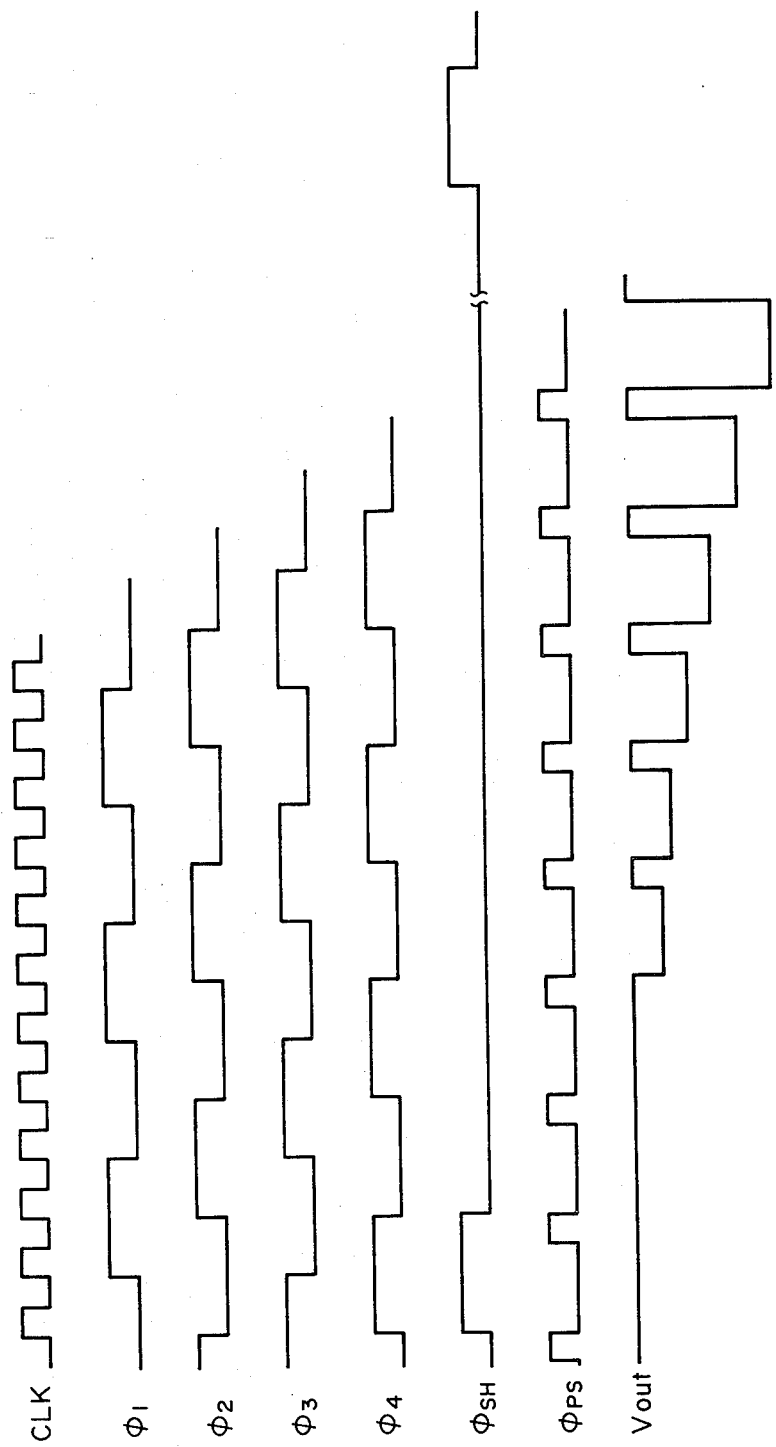
FIG. 5 is a timing chart showing the output from the driver circuit in the circuit construction shown in FIG. 4, and the output signals from the sensor array device based on the output from the driver circuit.

In the following, detailed examplanations will be given as to a concrete embodiment of the radiation beam incident position detector according to the present invention which follows the above-described basic principle. At first, FIG. 4 schematically illustrates the basic construction of the electrical circuit system of the embodimental device in the main. It should be noted that the image forming lens 1, the radiation source 2, the sensor array device 3, the prism 4, and the predetermined focal plane 6 are in such positional relationship as has been explained with respect to FIG. 1. In this embodiment, the sensor array device 3 uses single dimensional CCD photosensors of 4-phase drive. A reference numeral 7 designates a well known drive circuit to drive the sensor array device 3, which produces, as outputs, 4-phase transfer clock pulses $\phi_1$ to $\phi_4$, a reset pulse $\phi_{RS}$ synchronous with $\phi_2$ and $\phi_4$, and a shift pulse $\phi_{SH}$ of a predetermined cycle and synchronous with $\phi_4$. Here, the transfer clock pulses $\phi_1$, $\phi_2$, $\phi_3$, and $\phi_4$ are for driving charge transfer CCD analog shift registers, and are used for transferring signal charges to the output section (charge-voltage conversion section) through the CCD analog shift registers. In the present embodiment, the 4-phase clock pulses $\phi_1$ to $\phi_4$ are used, but no specific limitations are necessary for the number of phase and the transfer system. The shift pulse $\phi_{SH}$ is applied to a shift gate electrode for transferring the signal charge accumulated in the sensor part for a predetermined accumulation time to the CCD analog shift registers. The reset pulse $\phi_{RS}$ is applied for the charge resetting in the output section. A time-sequential signal voltage waveform to be produced as an output from the output section is diagrammatically illustrated in FIG. 5 as $V_{out}$. In this embodiment, a signal output from the sensor array device 3 is produced in synchronism with the transfer clock pulses $\phi_2$ and $\phi_4$. A reference numeral 8 designates a circuit for removing an offset voltage (e.g., a dark current component) of the time-sequential signal voltage to be output from the sensor array device 3. As shown in FIG. 5, the output from the sensor array device 3 in this embodiment is obtained as a negative voltage signal, and this output is reversed and amplified in the abovementioned offset voltage removing circuit, and produced as a positive voltage signal output. A reference numeral 9 designates an analog gate circuit consisting of an FET analog switch, etc., and is so controlled that it may be turned on only during the time section of from ti to tk as already explained in FIG. 2 by a control signal $\phi_{11}$ (shown in FIG. 7) from a control circuit 12. A numeral 10 refers to a signal polarity reversing circuit, which is so controlled that it may reverse the polarity of the input signal with the timing of tj as already explained in FIG. 2 by a control signal $\phi_{12}$ (shown in FIG. 7) from the control circuit 12, and produce the same as an output. A reference numeral 11 designates an integration circuit to integrate an output from the signal polarity reversing circuit 10, which is reset by the shift pulse $\phi_{SH}$. A reference numeral 13 designates a sample-hold circuit for sampling and holding an output (S) from the integration circuit 11, which is so controlled that it may sample the output (S) from the integration circuit 11 with a timing of tk by a control signal $\phi_{13}$ (shown in FIG. 7) from the control circuit 12, and thereafter hold the same. Reference numerals 14, 14' are respectively comparators constituting a wind comparator circuit for comparing an output ($V_s$) from the sample-hold circuit 13 with a predetermined voltage range of $-V_{ref}$ to $+V_{ref}$ as determined by potentiometers R1, R2. The comparator 14 is so constructed that it may receive the output ($V_s$) in its non-reversing input and the reference voltage $+V_{ref}$ in its reversing input so as to compare the output ($V_s$) from the sample-hold circuit 13 with the reference voltage $+V_{ref}$. The comparator 14' is so constructed that it may receive the output ($V_s$) in its reversing input and the reference voltage $-V_{ref}$ in its non-reversing input so as to compare the output ($V_s$) from the sample-hold circuit 13 with the reference voltage $-V_{ref}$. Accordingly, when $-V_{ref} \leq V_s \leq +V_{ref}$, the outputs from both comparators 14, 14' assume the low signal level, and, when $V_s > +V_{ref}$, the output from the comparator 14' remains low in the signal level, while the output from the comparator 14 assumes the high level. On the other hand, when $V_s < -V_{ref}$, the output from the comparator 14 remains low in its signal level, while the output from the comparator 14' assumes the high level. A reference numeral 15 designates a display control circuit to control LED's 18, 19 for display in accordance with the logical conditions of the outputs from the comparators 14, 14'. The circuit is so constructed that, when the output from the comparator 14 is at the high signal level, it may control the LED 18; when the output from the comparator 14' is at the high signal level, it may control the LED 19; and when the outputs from both comparators 14, 14' are at the low signal level, it may control both LED's 18, 19 to emit light or extinguish it. A reference numeral 16 designates a motor control circuit to control a motor 17 to perform automatic focus adjustment of the image forming lens 1 based on the outputs from the comparators 14, 14'. The abovementioned control circuit 12 receives the shift pulse $\phi_{SH}$ and the transfer clock pulse $\phi_2$ from the drive circuit 7, on the basis of which it produces, as an output, a range and a reverse integration position of the sensor elements for use in the sensor array device 3, i.e., it outputs control signals $\phi_{11}$, $\phi_{12}$, and $\phi_{13}$ for regulating the timings ti, tj, and tk, respectively, as has already been explained in FIG. 2.

Figure 3:
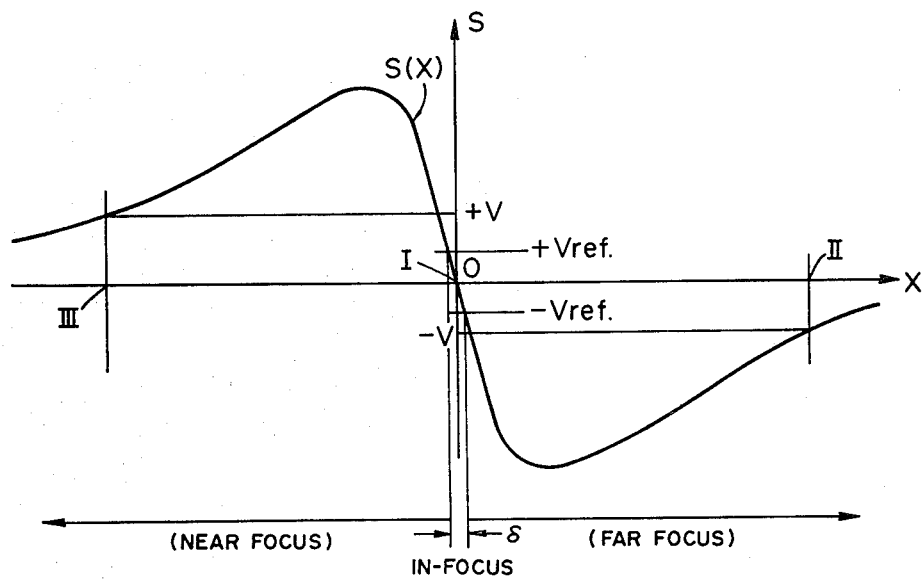
FIG. 3 is an output waveform diagram showing variations in the output signal (S) obtained by the reverse integration as shown in FIGS. 2A through 2C in accordance with variations in the incident position of the radiation beam.

In the above-described construction, when the reading operation of the output from the sensor array device 3 is performed by actuation of the drive circuit 7 in the state of the radiation beam being projected from the radiation source 2 to a target object, and the reflected radiation beam from the target object being incident on a position on the radiation receiving surface of the sensor array device 3, which corresponds to the focus adjustment state of the image forming lens 1 with respect to the object at this time, the integration circuit 11 is first reset by the shift pulse $\phi_{SH}$ at this time, and the control circuit 12 starts its timing regulating operation, at the same time, on the basis of the reset pulse $\phi_{RS}$ in response to this shift pulse $\phi_{SH}$. On the other hand, the output from the sensor device as read out is deprived of the offset voltage (noise component) contained therein by the offset voltage removing circuit 8, after which it is applied to the analog gate circuit 9. Here, during a period of from commencement of reading of the output from the sensor device to the time ti, the control circuit 12 sets the analog gate circuit 9 in its gate-off state by rendering the control signal $\phi_{11}$ to be at the low level. As soon as the time ti is reached, and from this time on until the time tk is reached, the control signal $\phi_{11}$ is rendered high level, thereby setting the analog gate circuit 9 in its gate-on state. Accordingly, the signal polarity reversing circuit 10 is applied with the sensor device outputs of the time section of from ti to tk. Here, until the time tj is reached, the control circuit 12 sets the signal polarity reversing circuit 10 in its signal polarity non-reversing output mode, wherein the input signal thereto is made an output therefrom, as it is, without being polarity-reversed, by rendering the control signal $\phi_{12}$ to be at the low level. When the time tj is reached, and from this time on until the time tk is reached, the control circuit 12 sets the signal polarity reversing circuit 10 in its signal polarity reversing output mode, wherein the input signal thereto is polarity-reversed for the output therefrom, by rendering the control signal $\phi_{12}$ to be at the high level. Therefore, the integration circuit 11 first integrates the signals in the time section of from ti to tj out of the time section of from ti to tk, after which it performs the polarity reversing integration for the signals of the time section of from tj to tk. In this manner, the operation as expressed in the foregoing equation (1) is effected by the integration circuit 11, and, when the time instant tk is reached, the integration circuit 11 produces, as an output therefrom, a difference (S) between the signal quantities in the time section of from ti to tj and the signal quantities in the time section of from tj to tk. When the time tk is reached, the control circuit 12 renders the control signal $\phi_{13}$ to be at the high level, whereby the sample-hold circuit 13 samples and holds the output (S) from the integration circuit 11 at the time instant tk. Thus, the output ($V_s$) from the sample-hold circuit 13 in this instant represents the incident position of the reflected radiation beam from the target object on the radiation receiving surface of the sensor array device 3. In this case, from what has been explained with respect to FIG. 2, when $V_s=0$, the incident position of the reflected radiation beam coincides with the boundary between the j'th sensor element and the j+1st sensor element, i.e., the conjugative point C; when $V_s>0$, it is deviated to the side B from the conjugative point C; and when $V_s<0$, it is deviated to the side A from the conjugative point C, and, in addition, the absolute value level $|V_s|$ at this time represents the deviation quantity. In the above-described manner, the incident position of the reflected radiation beam on the radiation receiving surface of the sensor array device 3 is detected, the detection result of which is indicated by the output ($V_s$) from the sample-hold circuit 13, i.e., the output (S) from the integration circuit 11. Thereafter, the output ($V_s$) from the sample-hold circuit 13 at this time is compared with a predetermined voltage range of from $-V_{ref}$ to $+V_{ref}$ by the comparators 14, 14', based on which result the display state by the LED's 18, 19 is controlled by the display control circuit 15, and the lens driving motor 17 is controlled by the motor control circuit 16. From what has been explained with respect to FIGS. 2 and 3, in the above-described case, the high level output from the comparator 14 denotes the near focus condition, the high level output from the comparator 14' denotes the far focus condition, and the low level outputs from both comparators 14, 14' denote the in-focus condition (i.e., as shown in FIG. 3, a range $\delta$ to be determined by $+V_{ref}$ and $-V_{ref}$ is made the in-focus range). Consequently, lighting of the LED 18 represents the near focus state, the lighting of the LED 19 represents the far focus state, and lighting or extinction of both LED's 18, 19 represents the in-focus state. From this, the motor control circuit 16 may be constructed in such a manner that it causes the motor 17 to rotate in a predetermined direction to retract the image forming lens 1 by the high level output from the comparator 14, causes the motor 17 to reversely rotate by the high level output from the comparator 14', and causes the motor 17 to stop by the low level outputs from both comparators 14, 14'.

In the following, concrete constructions of the above-mentioned control circuit 12, the offset voltage removing circuit 8, and the signal polarity reversing circuit 10 will be explained in detail.

Figure 6:
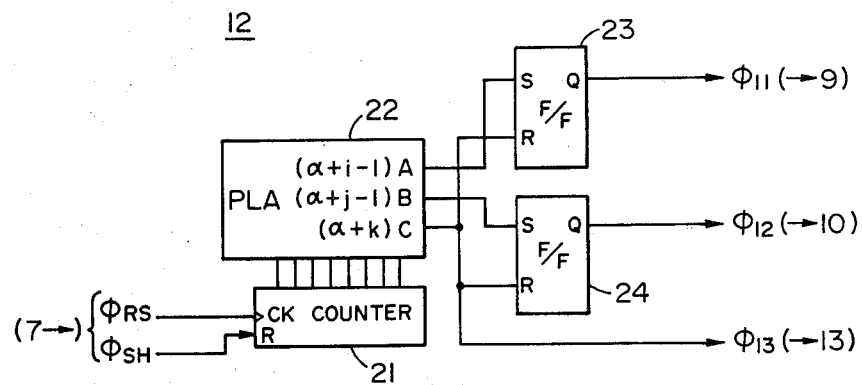
FIG. 6 is a block diagram showing one embodimental construction of the control circuit in the circuit system shown in FIG. 4.
Figure 7:
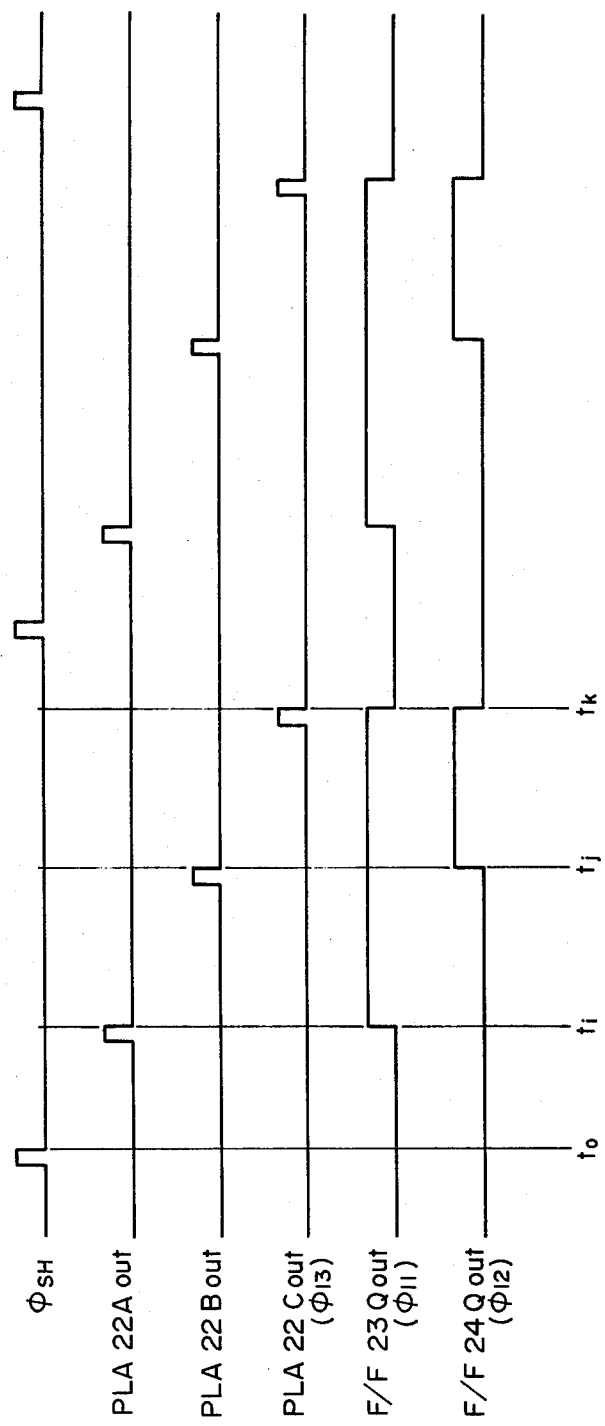
FIG. 7 is a timing chart showing the operating relationship in the circuit in FIG. 6.

First of all, FIG. 6 illustrates one embodimental construction of the control circuit 12, wherein a reference numeral 21 designates a counter to count the reset pulse $\phi_{RS}$, which is so constructed as to be reset by the shift pulse $\phi_{SH}$, and a reference numeral 22 designates a programmable logic array (ROM), the contents of which have been programmed beforehand so as to regulate the timings ti, tj, and tk on the basis of the counted output from the counter 22. More concretely, the contents of the programmable logic array is programmed beforehand in such a manner that, if it is assumed that, after the shift pulse $\phi_{SH}$ is applied to the sensor array device 3, $\alpha$ numbers of the reset pulse $\phi_{RS}$ are applied thereto until a signal is read out of the first sensor element, a signal pulse output (as shown in FIG. 7) is produced from its output terminal A when the counted value of the counter becomes "$\alpha+i-1$", a single pulse output is produced from its output terminal B when the counted value of the counter 21 becomes "$\alpha+j-1$", and the single pulse output is produced from the output terminal C when the counted value of the counter 21 becomes "$\alpha+k$". A reference numeral 23 designates an RS flip-flop which is so constructed that it may be reset by the pulse from the output terminal C after it has been set by the pulse from the output terminal A. A numeral 24 refers to an RS flip-flop which is so constructed that it may be reset by the pulse from the output terminal C after it has been set by the pulse from the output terminal B of the programmable logic array 22. An output Q of the flip-flop 23 (shown in FIG. 7) becomes the control signal $\phi_{11}$ to the analog gate circuit 9 shown in FIG. 4, an output Q of the flip-flop 24 (shown in FIG. 7) becomes the control signal $\phi_{12}$ to the signal polarity reversing circuit 10 shown in FIG. 4, and an output from the output terminal C of the programmable logic array 22 becomes the control signal $\phi_{13}$ to the sample-hold circuit 13.

Figure 8:
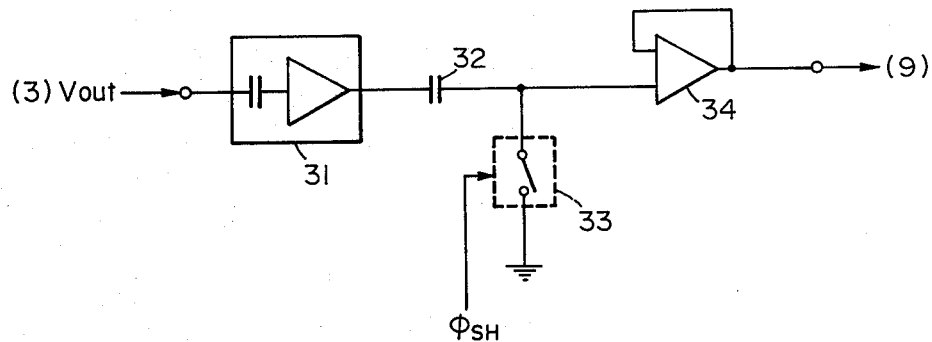
FIG. 8 is a partial circuit diagram showing one embodimental construction of the offset voltage removing circuit in the circuit system shown in FIG. 4.

FIG. 8 shows one embodimental construction of the offset voltage removing circuit 8, in which the output from the sensor array device 3 is subjected to the a.c. amplification, after which it is clamped to remove the offset component (d.c. component) of the signal voltage. In the drawing, a numeral 31 refers to an a.c. amplifier, 32 a capacitor for clamping (i.e. for cutting direct current component), 33 a resetting analog switch of the capacitor 32, and 34 a buffer amplifier for output. The offset component (here, it is principally the d.c. component) in the signal voltage is removed by the capacitor 32, whereby an output signal, from which the offset component has been removed, is produced from the buffer amplifier 34. Incidentally, the analog switch 33 is turned on so as to reset the capacitor 32 by the shift pulse $\phi_{SH}$.

FIGS. 9A, 9B, and 9C illustrate three embodimental constructions of the abovementioned signal polarity reversing circuit 10. The embodiment shown in FIG. 9A is so constructed that an output from a reversing amplifying circuit consisting of an operational amplifier 41 and resistors R3, R4 which are connected as shown, and an output from a non-reversing amplifying circuit consisting of an operational amplifier 42 and resistors R5, R6, R7, and R8 which are connected as shown may be respectively selected by analog switches 43, 44. To the analog switch 43, the control signal $\phi_{12}$ is applied, and, to the analog switch 44, an inverted signal $\overline{\phi_{12}}$ by an inverter 45 (the signal is equal to an output $\overline{Q}$ of the flip-flop 28 as shown in FIG. 6). The embodiment shown in FIG. 9B is such that, in a construction of the non-reversing amplifying circuit consisting of an operational amplifier 46, resistors R9, R10, and R11, and an analog switch 47 which are connected as shown, the operating mode thereof may be changed over from the non-reversing amplifying mode to the reversing amplifying mode by closure of the analog switch 47, to which the abovementioned control signal $\phi_{12}$ is applied. The embodiment shown in FIG. 9C is such that, in a construction of the reversing amplifying circuit consisting of an operational amplifier 48, resistors R12, R13, and R14, and an analog switch 49 which are connected as shown, the operating mode thereof may be changed over from the reversing amplifying mode to the non-reversing amplifying mode by closure of the analog switch 49, to which the inverted signal $\phi_{12}$ of the control signal $\overline{\phi_{12}}$ by an inverted 50 is applied.

In the foregoing, one preferred embodiment of the present invention has been described. In the following, several modifications or improvements to this embodimental device will be explained from various standpoints.

As has been explained with reference to FIGS. 1 through 4, when a particular radiation beam emitted from the radiation source 2 is to be detected, highly precise and accurate description of the signal radiation beam cannot apparently be expected at all unless harmful radiation due to external light, etc. surrounding the radiation source is effectively removed. Concerning this, if the energy distribution of such harmful radiation on the radiation receiving surface of the sensor array device 3 is uniform, the noise signal component which is unavoidably contained in the output from the sensor array device 3 due to such harmful radiation can be automatically removed in the signal processing in accordance with the aforementioned equation (1) by the combined use of the signal polarity reversing circuit 10 and the integration circuit 11. However, if the energy distribution of this harmful radiation is not uniform (this often takes place due to the fact that the lens 1 has the image forming capability, and the sensor array device 3 is so disposed that it may receive the radiation through the lens 1), the effective removal of the noise signal component due to the harmful radiation become almost impossible by only the signal processing in accordance with the equation (1). In this case, an error component derived from such non-uniformity of the energy distribution is unavoidably included in the output from the integration circuit 11, as the result of which there arises such apprehension that considerable erroneous detection would be brought about.

Therefore, in the following, explanations will be given in reference to FIG. 10 as to a signal processing method which is very effective in removing the noise signal component to be caused by the harmful radiation due to external light, etc., the energy distribution of which on the radiation receiving surface of the sensor array device 3 becomes non-uniform.

As already mentioned, the shift pulse $\phi_{SH}$ to the sensor array device 3 is repeatedly produced as an output with a certain definite period, so that the signal charge accumulation time of each sensor element in the sensor array device 3 becomes constant as shown by T in FIG. 10A (this T is a period from trailing of a certain shift pulse $\phi_{SH}$ to trailing of subsequent shift pulse $\phi_{SH}$). On the other hand, in order to discriminate the harmful radiation due to external light, etc. and the signal radiation beam emitted from the radiation source 2, the radiation source 2 is controlled in such a manner that projection and non-projection (interception) of the signal radiation beam from the radiation source 2 may be alternately repeated at every one cycle of the shift pulse $\phi_{SH}$ as shown in FIG. 10B (hence, the waveform shown in FIG. 10B is also the waveform of the driving signal to the radiation source 2; and a signal of the high level denotes the projection and a signal of the low level denotes the interception). The projection period T' of the signal radiation beam in this case is a predetermined period within the signal charge accumulating time T of the sensor array device 3 (here, T'=T). Accordingly, there becomes obtainable alternately from the sensor array device 3 an output as represented by $V_{EV1}$ which does not contain a response signal to the signal radiation beam from the radiation source 2 at every one cycle of the output reading as generally shown in FIG. 10C, i.e., an output to be brought about by only the harmful radiation due to external light, etc. surrounding the radiation source, and an output as represented by $V_{EV2}$ which contains the response signal to the signal radiation beam. Incidentally, $V_{EV}$ in FIG. 10C is a waveform of the envelope of the sensor array device output, which practically becomes a pulse waveform as has been well known (vide: "$V_{out}$" in FIG. 5).

Under the abovementioned setting, for the purpose of removing the noise signal component due to the harmful radiation, there is applied to the signal polarity reversing circuit 10 a control signal $\phi'_{12}$ as shown in FIG. 10E. The signal is of such a nature that it renders the circuit 10 to be in a signal polarity non-reversing output mode only during a period of from the abovementioned time tj when reading the sensor device output to a corresponding time t'j when reading the subsequent sensor device output, and renders the circuit 10 to be in a signal polarity reversing output mode in other period than the above, whereby the output becomes as shown in FIG. 10F. In this case, the time ti and t'i, tj and t'j, and tk and t'k are mutually in the relationship of being differentiated for one cycle of the sensor device output reading, and are relatively corresponding. Further, they are in a relationship of $ti-tj=tj-tk=t'i-t'j=t'j-t'k$. In contrast to this, the shift pulse $\phi_{SH}$ is applied to the integration circuit 11, as shown in FIG. 10H, as the reset signal $\phi_{14}$ therefor at a rate of once every two cycles in such a manner that the two cycles of the sensor device output reading constitutes one detection cycle. Also, a control signal $\phi'_{13}$ is applied to the sample-hold circuit 13, as shown in FIG. 10G, as the control signal therefor at a rate of once every two cycles of the sensor device output reading. The control signal $\phi'_{13}$ is of such a nature that it causes an output from the integration circuit 11, immediately before it is reset, to be sampled and held. In this manner, there is performed by the integration circuit 11 an operation to be represented by the following equation (2), whereby the radiation beam is projected from the radiation source 2, while the noise signal component derived from the harmful radiation due to external light, etc. is being effectively removed, and the reflected radiation beam returned from the target object can be accurately detected its incident position on the radiation receiving surface of the sensor array device.

$$S = K \left[ - \int_{t_i}^{t_j} V(t)dt + \int_{t_j}^{t_k} V(t)dt + \int_{t'_i}^{t'_j} V(t)dt - \int_{t'_j}^{t'_k} V(t)dt \right] \quad (2)$$

Explaining more understandably, the operation of $$- \int_{t_i}^{t_j} V(t)d + \int_{t'_i}^{t'_j} V(t)dt$$

in the bracket of the above equation (2), as is apparent from the corresponding relationship (i) in FIG. 10F, signifies removal of the noise signal component due to the harmful radiation from one of two regions of the same size as established on the radiation receiving surface of the sensor array device 3, while the operation of $$\int_{t_j}^{t_k} V(t)dt - \int_{t'_j}^{t'_k} V(t)dt,$$

as is apparent from the corresponding relationship (ii) in FIG. 10F, signifies removal of the noise signal component due to the harmful radiation from the other region. And, since comparison of a response signal with the signal radiation beam from the radiation source relative to these two regions constitutes the subject matter of the invention, the incident position of the signal radiation beam can be accurately detected, while avoiding the influence of the harmful radiation by the signal processing in accordance with the equation (2).

Incidentally, the signal processing in accordance with the equation (2) can be easily attained by a very slight modification of the circuit system shown in FIG. 4, in particular, a slight modification of the control circuit 12. In connection with this, reference is had to FIG. 11 showing a construction, in which the control circuit 12 has been modified from the construction shown in FIG. 6 so that it may perform the signal processing in accordance with the above equation (2). In the drawing, those elements designated by the same reference numerals as in FIG. 6 are exactly the same as those already described. In the drawing, a reference numeral 51 designates a T-type flip-flop provided in place of the flip-flop 24 in FIG. 6, which is so connected that its output Q may vary its state in synchronism with trailing of an output signal from the output terminal B of the programmable logic array 22. Accordingly, the output Q varies as shown in FIG. 10E with respect to the output signal from the terminal B of the programmable logic array 22 shown by PLA 22 Bout in FIG. 7, whereby the output Q of this flip-flop 51 is applied to the signal polarity reversing circuit 10 as the control signal $\phi'_{12}$ thereto. A numeral 52 refers to an AND gate for taking a logic product of output signals from the output terminal C of the programmable logic array 22 shown by PLA 22 Cout in FIG. 7, and the output thereof is as shown in FIG. 10G, whereby the output from this AND gate 52 is applied to the sample-hold circuit 13 as the control signal $\phi'_{13}$. A numeral 53 refers to an AND gate for taking a logic product of the output Q of the flip-flop 51 and the shift pulse $\phi_{SH}$, and the output thereof is as shown in FIG. 10H, whereby the output from this AND gate 53 is applied to the integration circuit 11 as the reset signal thereto, in place of the shift pulse $\phi_{SH}$. A reference numeral 54 designates a T-type flip-flop which is so connected that a state of its output Q may be varied in synchronism with trailing of the shift pulse $\phi_{SH}$. The output Q varies as shown in FIG. 10B with respect to the shift pulse $\phi_{SH}$, whereby the output Q from this flip-flop 54 is applied to the driving circuit 55 as the driving signal ($\phi_{15}$) for the abovementioned radiation source 2. As shown in the drawing, the radiation source driving circuit 55 has an npn switching transistor Tr1 which is so constructed that its base may receive the output Q from the flip-flot 54 through a protective resistor $R_{15}$, and its collector side is connected to the radiation source 2 together with a protective resistor $R_{16}$. Thus, the radiation source 2 emits the radiation beam only during a period, in which the output Q from the flip-flop 54 is at the high level, and it functions to intercept the radiation beam in the rest of the period.

The signal processing in accordance with the equation (2) can be achieved by the abovementioned modification in the circuit construction.

Still another modification of the circuit construction will be described hereinbelow.

In the embodiment already explained with reference to FIG. 4, one reading of the sensor device output constitutes one detection cycle. However, when, for example, the projecting power of the radiation source 2 is very weak, satisfactory detection result cannot always be obtained with only one detecting operation. In such case, it may be feasible that a plurality of detecting operations are made to constitute one detection cycle.

FIG. 12 illustrates one embodiment of a circuit to be added in such instance. In the drawing, a reference numeral 56 designates a trailing synchronous type counter to count the shift pulse $\phi_{SH}$, a numeral 57 refers to a programmable logic array (ROM), the contents of which have been programmed beforehand so that a high level signal output may be produced at a time instant when the counted value of the counter 56 has reached a predetermined value N, a numeral 58 refers to a one-shot circuit (multi-vibrator) which is so constructed as to produce a single pulse output in response to rising of the output from the programmable logic array 57, a reference numeral 59 designates a delay circuit, a time constant of which is so set that an output pulse from the one-shot circuit 58 may be delayed during a time period corresponding to $t_0-t_k$ as already explained with reference to FIG. 7, and a numeral 60 also refers to a delay circuit, a time constant of which is so set that the output pulse from the one-shot circuit 58 may be delayed for a time period which is greater than the time period corresponding to the above-mentioned time $t_0-t_k$, and for the time period T as already explained with reference to FIG. 10, i.e., the time period which is shorter than one cycle of the shift pulse $\phi_{SH}$. The output pulse from the delay circuit 59 is applied to the sample-hold circuit 13 in FIG. 4 as the control signal $\phi''_{13}$, while the output pulse from the delay circuit 60 is applied to the integration circuit 11 in FIG. 4 as the reset signal $\phi'_{14}$ thereto in place of the shift pulse $\phi_{SH}$.

By adding such circuit as mentioned in the preceding, there can be obtained the detection results with the detection operations for N times as the one detection cycle. Incidentally, when this construction is to be added to the modification as explained with reference to FIG. 11, the above-mentioned predetermined number of times for the detection operation can be made even.

In the following other modification of the circuit construction will be explained.

In order to ensure satisfactory detection result, the modification as explained with reference to FIG. 12 may be adopted. However, for the purpose of attaining constantly stabilized and satisfactory detection precision, irrespective of the reflective power of the target object or variations in intensity of the reflected signal radiation beam derived from distance of the object, it may also be feasible that operation in accordance with the following equation (3) be performed in parallel with the operation in accordance with the equation (1):

$$M = K \int_{t_i}^{t_k} V(t)dt \qquad (3)$$

while the signal processing as expressed by the above-mentioned equation (2) is repeatedly performed until a value M reaches its predetermined value, and, at a time instant when this value M reaches the predetermined value, the one detection cycle is terminated to obtain its detection result.

An embodiment including such modification will be explained in reference to FIGS. 13A and 13B. In the drawing, those elements designated by the same reference numerals as those in FIGS. 4, 11 and 12 are exactly same as those already described, hence the explanation hereinbelow will be made to only the construction which is related to the modification. In the drawing, a reference numeral 10' designates a signal polarity reversing circuit similar to the signal polarity reversing circuit 10, which is so constructed that an invert signal $\overline{\phi_{15}}$ (shown in FIG. 14G) of the radiation source driving signal $\phi_{15}$ (shown in FIGS. 10B and 14B) as already explained with reference to FIGS. 10 and 11, which is inverted by an inverter 61, is applied thereto as the control signal $\phi''_{12}$. Accordingly, the output therefrom is as shown in FIG. 14H. A reference numeral 11' designates an integration circuit similar to the abovementioned integration circuit 11 for integrating an output from the signal polarity reversing circuit 10'. By combining the signal polarity reversing circuit 10' and the integration circuit 11', therefore, there can be performed the signal processing to be expressed by the following equation (4) at the time of one reading of the sensor device output:

$$M = K \left[ \int_{t_i}^{t_k} V(t)dt - \int_{t'_i}^{t'_k} V(t)dt \right] \qquad (4)$$

A numeral 62 refers to a comparator for comparing an output (M) from the integration circuit 11' with a predetermined reference level $V_{refm}$ to be obtained by a potentiometer R17. The comparator 62 is so connected that it may produce a high level signal output when the output (M) from the integration circuit 11' becomes higher than the reference level $V_{refm}$ by application of the output (M) from the integration circuit 11' to the non-reversing input of the comparator, and the reference level $V_{refm}$ to the reversing input thereof. A reference numeral 63 designates an OR gate for taking a logic sum of the output from the comparator 62 and the output from the programmable logic array 57 as already explained with reference to FIG. 12. An output from this OR gate 63 is applied to the one-shot circuit 58 as explained with reference to FIG. 12. Incidentally, the integration circuit 11' is so constructed that it may be reset together with the integration circuit 11 by an output from the delay circuit 60 as explained with reference to FIG. 12. Concrete construction of the control circuit 12 in this case may be such one that the AND gates 52 and 53 are removed from the circuit construction shown in FIG. 11. The radiation source driving circuit 55 has such a construction as indicated by a dash line in FIG. 11. In other respects than the abovementioned, the circuit construction in FIGS. 13A and 13B is the same as that obtained by adding the circuit of FIG. 12 to the circuit system shown in FIG. 4.

According to such circuit construction, no receipt of the output (S) from the integration circuit 11, i.e., the detection result, is performed by the sample-hold circuit 13 until the level of the output (M) from the integration circuit 11' reaches the predetermined reference level $V_{refm}$, or the counted value of the counter 56 reaches N. When the detecting operation is repeated and the level of the output (M) from the integration circuit 11' reaches the reference level $V_{refm}$ or the counted value of the counter 56 reaches N, a single pulse output is produced from the one-shot circuit 58 due to change of the output level from the OR gate 63 from low to high, and, after lapse of a predetermined time, receipt of the output (S) from the integration circuit 11, i.e., the detection result, is performed by the sample-hold circuit 13 due to the output from the delay circuit 59. Based on this output from the sample-hold circuit 13, display of the focus adjustment state and the automatic focus adjustment of the lens 1 are performed in the manner as already mentioned in the foregoing.

Thus, according to the construction of the modified embodiment shown in FIGS. 13A and 13B, the detection precision can be maintained satisfactorily stably irrespective of the reflective power of the target object or variations in intensity of the signal radiation beam due to distance of the object.

Stabilization of this detection precision can also be attained satisfactorily only by controlling the number of times of the detecting operation based on the output (M) from the integration circuit 11'. Accordingly, if no control of the number of times of the detecting operation based on the output from the counter 56 is required, the output from the comparator 62 may be directly applied to the one-shot circuit 58 after removing the circuit blocks 56, 57 and 63 in FIG. 13B.

Further, the circuit construction shown in FIGS. 13A and 13B is operated on the premises that influence of the harmful radiation due to external light, etc. as already explained with respect to FIGS. 10 and 11, in particular, the radiation whose energy distribution becomes non-uniform, is removed, for which purpose the signal polarity reversing circuit 10' is provided. However, if the influence due to such disturbing radiation is negligible; in other words, if the construction as explained with respect to FIG. 4 is adopted, the signal polarity reversing circuit 10' becomes unnecessary, whereby the output from the analog gate circuit 9 may be directly applied to the integration circuit 11'.

Incidentally, the reference level $V_{refm}$ may be set at a level corresponding to a threshold level of the output from the integration circuit 11' at the time of its one integration operation, which corresponds to a range $\delta$ where the lens is considered to be in the in-focus state, or a level which is slightly lower than the abovementioned level, as shown, for example, in FIG. 15. A reference letter M(X) in the drawing designates variation in output from the integration circuit 11' at its one integration operation to each focus adjustment state of the lens 1.

Still further modification of the circuit construction will be explained in the following.

The modified embodiments as explained with reference to FIGS. 12 to 15 aim principally at improvement and stabilization in the detection precision by the gain control in the signal processing circuit system. Such improvement and stabilization in the detection precision can also be achieved satisfactorily by a method, for example, wherein the level of the sensor device output is appropriately adjusted by controlling the charge accumulation time in the sensor array device 3.

In the following, explanations will be given in reference to FIG. 16 as to a modified embodiment from such standpoint. In the drawing, those elements designated by the same reference numerals as those in FIG. 4 are identical with those elements already explained in the foregoing. In this embodiment, there is used the sensor array device 3 of a type having a well known electric discharging over-flow drain gate (anti-blooming gate).

Explaining the construction which is different from the embodiment shown in FIG. 4, there is provided an integration circuit 11" similar to the integration circuit 11' as has been explained with reference to FIG. 13A for integrating an output from the analog gate circuit 9 as it is. A reference numeral 13' designates a sample-hold circuit for sampling and holding an output (M) from the integration circuit 11" in response to the control signal $\phi_{13}$ from the control circuit 12. Numerals 64, 64' refer to comparators constituting the wind comparator circuit for comparing an output ($V_M$) from the sample-hold circuit 13' with a predetermined voltage range of from $V_{MIN}$ to $V_{MAX}$ ($0 < V_{MIN} < V_{MAX}$) which has been determined by a potentiometer R18 and which is for discriminating propriety of the accumulation time. The comparator 64 receives the output ($V_M$) in its non-reversing input and the reference voltage ($V_{MAX}$) in its reversing input so as to compare the output ($V_M$) from the sample-hold circuit 13' with the upper limit reference voltage ($V_{MAX}$). The comparator 64', on the other hand, receives the output ($V_M$) in its reversing input and the reference voltage ($V_{MIN}$) in its non-reversing input so as the compare the output ($V_M$) from the sample-hold circuit 13' with the lower limit reference voltage ($V_{MIN}$). Therefore, in case of $V_{MIN} \leq V_M \leq V_{MAX}$, the outputs from both comparators 64, 64' assume the low level; in case of $V_M > V_{MAX}$, the output from the comparator 64' remains in the low level, while the output from the comparator 64 assume the high level; and in case of $V_M < V_{MIN}$, the output from the comparator 64 remains in the low level, while the output from the comparator 64' assumes the high level. The outputs from these comparators 64, 64' are applied to the control circuit 12 which, in turn, performs control of the charge accumulation time of the sensor array device 3 based on the outputs from the comparators 64, 64'. More concretely, the control circuit 12 controls the charge accumulation time in each sensor of the sensor array device 3 by controlling an application period ($T_1$ in FIGS. 17 and 19), after application of the shift pulse $\phi_{SH}$, of an integration clear signal $\phi_{IC}$ (vide FIGS. 17 and 19) for turning-on of the electric discharging anti-blooming gate of the sensor array device 3 based on the outputs from the comparators 64, 64', in other words, by controlling a period for performing the signal charge accumulation in each sensor ($T_2$ in FIGS. 17 and 19, i.e., the charge accumulation time, the termination of which corresponds to a time instant when the subsequent shift pulse $\phi_{SH}$ completes its application) by stopping the electric discharging through turning-off of the above-mentioned anti-blooming gate by rendering the integration clear signal $\phi_{IC}$ to be at the low level, since the shift pulse $\phi_{SH}$ here is produced as an output with a certain fixed cycle (T in FIGS. 17 and 19).

Besides the foregoing explanations, the circuit construction is exactly same as in the case of the embodiment shown in FIG. 4.

Now, in such circuit construction, control of the scanning output signal due to control of the charge accumulation time in the sensor array device 3 is performed in the following manner.

First of all, the shift pulse $\phi_{SH}$ is output from the sensor driver 7 at the time of reading the sensor device output, whereupon the integration circuit 11" is reset together with the integration circuit 11. Thereafter, the integration circuit 11" performs integration of the output from the analog gate circuit 9. Accordingly, at the time instant when the abovementioned time tk is reached, the output (S) from the integration circuit 11 is expressed by the foregoing equation (1), while the output (M) from the integration circuit 11' is expressed by the foregoing equation (3). In other words, the output (M) from the integration circuit 11' as expressed by the equation (3) corresponds to a brightness level of the incident light to the sensor array device 3. Therefore, the output (M), at the time instant when the time tk is reached, is held in the sample-hold circuit 13' by the control signal $\phi_{13}$ from the control circuit 12 as is the case with the sample-hold circuit 13. The output ($V_M$) denoting the brightness level information of the incident light on the radiation receiving surface of the sensor array device 3 is compared with the upper and lower limits reference voltages $V_{MAX}$ and $V_{MIN}$ by means of the comparators 64, 64', respectively. As the result, when $V_{MIN} \leq V_M \leq V_{MAX}$, i.e., when the scanning signal level is appropriate, the outputs from both comparators 64, 64' assume the low level; when $V_M > V_{MAX}$, i.e., when the scanning signal level is excessively large, the output from the comparator 64 assume the high level and the output from the comparator 64' assumes the low level; and when $V_M < V_{MIN}$, i.e., when the scanning signal level is excessively small, the output from the comparator 64 assumes the low level and the output from the comparator 64' assumes the high level. And, the control circuit 12, on the basis of the outputs from the comparators 64, 64', controls the scanning signal through a construction to be described in detail hereinafter in such a manner that, when the outputs from both comparators 64, 64' are at the low level, it maintains the charge accumulation time $T_2$ of the sensor array device 3, as it is, by maintaining the application period $T_1$ of the integration clear signal $\phi_{IC}$ in FIGS. 17 and 19, as it is; that when the output from the comparator 64 assumes the high level, it decreases the charge accumulation time $T_2$ by increasing the application period $T_2$ of the integration clear signal $\phi_{IC}$; and that when the output from the comparator 64' assumes the high level, it increases the charge accumulation time $T_2$ by decreasing the application period $T_1$ of the integration clear signal $\phi_{IC}$, thereby obtaining the appropriate scanning output signal level represented by $V_{MIN} \leq V_{BR} \leq V_{MAX}$.

In the following, explanations will be given in reference to FIG. 18 as to the detailed construction of the control circuit 12 which serves to control the aforedescribed operations. Incidentally, it should be noted that those elements designated by the same reference numerals as those in FIG. 6 are identical with those already explained with reference to FIG. 6, hence explanations in the following will be limited to those portions which are different in construction from those in FIG. 6.

In the drawing, a reference numeral 65 designates a binary up-down counter for setting the electric discharging time. The counter, in this embodiment, is of a trailing synchronous type 3-bit construction, and is set in an up-count mode by the high level output from the comparator 64 in FIG. 16 and in a down-count mode by the low level output therefrom. Incidentally, when the 3-bit outputs $Q_1$, $Q_2$, and $Q_3$ of the counter 65 are entirely at the low level in this particular embodiment, the electric discharging time $T_1$ is set at the shortest time (hence the charge accumulation time $T_2$ is set at the longest time), and a longer electric discharging time (hence a shorter charge accumulation time) is designated as the counter 65 is counted up. On the other hand, when the 3-bit outputs $Q_1$, $Q_2$, and $Q_3$ of the counter 65 are entirely at the high level, the longest time is set for the electric discharging time $T_1$ (hence the shortest time for the charge accumulating time $T_2$). Accordingly, the electric discharging time $T_1$ (i.e., the charge accumulating time $T_2$) can be controlled in eight stages in all depending on the high or low level of the 3-bit outputs $Q_1$, $Q_2$, and $Q_3$. A reference numeral 66 designates an OR gate for taking a logic sum of the outputs from the comparators 64, 64' shown in FIG. 16, a numeral 67 refers to an exclusive OR gate for taking an exclusive logic sum of the outputs $Q_1$ to $Q_3$ from the up-down counter 65 and the output from the comparator 64, and a reference numeral 68 designates an AND gate for taking a logic product of the outputs from the OR gate 66 and the exclusive OR gate 67 and the shift pulse $\phi_{SH}$, an output from which is applied to the up-down counter 65 as the count pulse. This up-down counter 68 is so constructed that it may be cleared, together with other circuit blocks, by a power-up clear signal PUC. A reference numeral 69 designates a programmable logic array (ROM), the contents of which have been programmed beforehand so that, when it receives 8-bit outputs from the counter 21 and 3-bit outputs $Q_1$ to $Q_3$ from the up-down counter 65, and the counted value of the counter 21 reaches a value to be designated by the 3-bit outputs $Q_1$ to $Q_3$ of the counter 65, it may produce a single pulse output (high level pulse output) from any one of the outputs of from "0" to "7". The programmable logic array is so constructed that it may produce, for example, a control pulse output corresponding to the shortest electric discharging time from the output "0", and a control pulse output corresponding to the longest electric discharging time from its output "7". A reference numeral 70 designates a NAND gate for taking a reversing logic sum of the outputs "0" to "7" from the programmable logic array 69, and a numeral 71 refers to an RS flip-flop of a trailing synchronous type which is so constructed that it may be set by the trailing of the shift pulse $\phi_{SH}$ and reset by the trailing of the output from the NAND gate 70, in which the output Q thereof (shown in FIG. 19) becomes the integration clear signal for controlling the electric discharging time $T_1$, hence the charge accumulating time $T_2$. In the above-described construction, the exclusive OR gate 67 is provided for the purpose of prohibiting the ring counting operation by the up-down counter 65 when the output from the comparator 64' assumes the high level due to $V_M < V_{MIN}$ in the state of the outputs $Q_1$ to $Q_3$ from the up-down counter 65 being entirely at the low level, i.e., in the state of the electric discharging time $T_1$ being set at the shortest time, as well as when the output from the comparator 64 assumes the high level due to $V_M > V_{MAX}$ in the state of the outputs $Q_1$ to $Q_3$ from the up-down counter 65 being entirely at the high level, i.e., in the state of the electric discharging time $T_1$ being set at the longest time, and of preventing erroneous control of the accumulation time from taking place, in these cases, by fixing the electric discharging time $T_1$ to a time which has already been set. Needless to say, the abovementioned longest electric discharging time is shorter than the cycle T of the shift pulse $\phi_{SH}$.

In the following, operations of the scanning signal control section of the abovementioned construction will be explained. First of all, when the power-up clear signal PUC is applied to this control section, the up-down counter 65 is cleared together with the other circuit blocks, and the outputs $Q_1$ to $Q_3$ all assume the low level, whereby the shortest electric discharging time (i.e., the longest charge accumulating time) is set at the initial stage. Subsequently, when the shift pulse $\phi_{SH}$ is output from the sensor driver 7, the counter 21 is cleared, and the flip-flop 71 is set by its trailing to render the output Q to be at the high level, whereby the anti-blooming gate is perfectly turned on in the sensor array device 3 to discharge the charge generated in each sensor and accumulation of the signal charge becomes prohibited. Thereafter, the counter 21 counts the reset pulse $\phi_{RS}$ from the sensor driver 7, and, when the counted value reaches a counted value which has already been designated by the outputs $Q_1$ to $Q_3$ from the up-down counter 65 at this time, a high level pulse output is produced from the programmable logic array 69 at this time instant, whereby the output from the NAND gate 70 changes from its high level to the low level, and the flip-flop 71 is reset to render the output Q therefrom to be at the low level. At this time instant, therefore, the anti-blooming gate is turned off to stop the electric discharging, and accumulation of the charge as generated starts in each sensor. Thereafter, when the shift pulse $\phi_{SH}$ is output again, the accumulated charge in each sensor of the sensor array device 3 is received in the analog shift register through the shift gate. After the accumulated charge is transferred to its output section through the analog shift register, it is converted to a voltage and produced as an output therefrom. In this instance, if the electric discharging time $T_1$, hence the charge accumulating time $T_2$, is appropriate, the outputs from both comparators 64, 64' assume the low level to satisfy the relationship of $V_{MIN} \leq V_M \leq V_{MAX}$, hence the output from the OR gate 66 assumes the low level, on account of which no change in the counting operation by the up-down counter 65 is performed, but the electric discharging time $T_1$ is maintained at the abovementioned shortest time, and the charge accumulating time $T_2$ is maintained at the abovementioned longest time. However, if it is assumed $VM > V_{MAX}$, for example, the up-down counter 65 is set in the up-count mode in order for the output from the comparator 64 to be at the high level, and, at the same time, the outputs from the OR gate 66 and the exclusive OR gate 67 both assume high level. Consequently, when the shift pulse $\phi_{SH}$ is output from the sensor drive 7, it is applied to the up-down counter 65 through the AND gate 68, and the counter 65 counts up by one. Thus, by subsequently setting the electric discharging time $T_1$ in a long time period, the charge accumulating time $T_2$ is subsequently controlled for a short time period, whereby the scanning signal level becomes lowered. This operation will be repeated until the condition of $V_{MIN} \leq V_M \leq V_{MAX}$ is finally reached.

When this state is reached, the outputs from the comparators 64, 64' both assume the low level, and change in the electric discharging time $T_1$ stops. In such control process, if it is assumed that $V_M < V_{MIN}$ in a state of the electric discharging time $T_1$ being set in a time other than the shortest time, i.e., in a state of the outputs $Q_1$ to $Q_3$ from the up-down counter 65 being other than the low level in their entirety, the up-down counter 65 is set in the down-count mode, since the output from the comparator 64 is at the low level. Also, by the output from the comparator 64' assuming the high level, the outputs from the OR gate 66 and the exclusive OR gate 67 both assume the high level. Accordingly, when the shift pulse $\phi_{SH}$ is applied through the AND gate 68, the up-down counter 65 counts down by one, whereby the electric discharging time $T_1$ is changed to a shorter time, and the charge accumulating time $T_2$ is increased to improve the scanning signal level. This operation is, of course, repeated until the state of $V_{MIN} \leq V_M \leq V_{MAX}$ is finally obtained. Incidentally, when the electric discharging time $T_1$ is the shortest, and $V_M < V_{MIN}$, i.e., the outputs $Q_1$ to $Q_3$ from the up-down counter 65 are entirely at the low level, and the output from the comparator 64 is at the low level, and when the electric discharging time $T_1$ is the longest, and $V_M > V_{MAX}$, i.e., the outputs $Q_1$ to $Q_3$ from the up-down counter 65 are entirely at the high level and the output from the comparator 64 is at the high level, the output from the exclusive OR gate 67 assumes the low level, on account of this, application of the shift pulse $\phi_{SH}$ to the up-down counter 65 is prohibited by the AND gate 68, so that the electric discharging time $T_1$ is fixed at the shortest and the longest time due to no change in the counting operation being effected in the counter 65.

Lastly, explanations will be given as to one embodiment, in which all the improvements and modifications as explained with reference to FIGS. 10 to 19 have been incorporated in the embodimental construction as explained in FIG. 4.

FIGS. 20A and 20B shows the entire construction of the device, wherein those elements which have been used in the previous embodiments are designated by the same reference numerals.

Explaining now those components which are different from those in the previous embodimental constructions, a reference numeral 72 designates an a.c. amplifier, which is used for removing a direct current component of a signal sent out from the sensor array device 3. A numeral 73 refers to a sample-hold circuit which is used for preventing unnecessary loss in a integrated value when a reset period (a period of $\phi_{RS}$) of the sensor device is held, and the signal is integrated by the subsequent integration circuit. 74 refers to an exclusive OR gate which produces a sampling pulse by taking an exclusive logic sum of the transfer clock $\phi_2$, $\phi_3$, and applies the signal sent out of the sensor array device 3 to the sample-hold circuit 73 so as to perform sampling. 75 designates a d.c. component reproduction circuit to reproduce a d.c. component of an output from the a.c. amplifier 72. The reproduction of this d.c. component is done with a signal output voltage at the timing of the shift pulse $\phi_{SH}$ at the reference voltage. By the way, combination of the a.c. amplifier 72 and d.c. reproduction circuit 75 corresponds to the offset voltage removing circuit 8 in the circuit system shown in FIGS. 4, 13A, and 16. In this particular embodiment, the offset voltage removing function is carried out by these a.c. amplifier and d.c. reproduction circuit. A reference numeral 76 designates a wind comparator circuit including the comparators 64, 64' and the potentiometer R18 shown in FIG. 16. A numeral 77 refers to another wind comparator circuit including the comparators 14, 14' and the potentiometers R1, R2.

In this embodiment, a control signal $\phi'_{15}$ as shown in FIG. 22 is applied to the radiation source driving circuit 55. In other words, the control signal is to instruct the radiation source driving circuit to project the signal radiation beam from the radiation source 2 at a rate of once every two cycles of the sensor device output reading operation and only during a period of from a time tj to the trailing of the subsequent shift pulse $\phi_{SH}$. In this instance, for removing the noise signal component derived from the harmful radiation such as external light, etc. as has already been explained with reference to FIGS. 10, 11, the two cycles of the sensor device output reading operation, i.e., the detection operations for two times, are made the one detection cycle. On account of this, signals $\phi'_{13}$ and $\phi_{14}$ of the timings as shown in FIG. 22 are applied respectively to the sample-hold circuit 13' as the sampling signal thereto as well as to the integration circuit 11'' as the reset signal thereto. Incidentally, these signals correspond to the signals explained with reference to FIGS. 10, 11.

Besides the foregoing explanations, the embodimental construction in FIGS. 20A and 20B is exactly same as that already explained, and the afore-explained functions can be attained.

For the construction of the control circuit 12 in this embodiment, there is adopted a construction by combination of the circuits shown in FIGS. 21 and 23.

That is, FIG. 21 shows the construction of the control circuit 12, mainly, the sequence control section thereof. The construction is substantially same as that of the circuit shown in FIG. 11. The points of difference are that the AND gate 78 for taking a logic product of the output Q from the flip-flop 51 (which becomes a control signal $\phi'_{12}$ to the signal polarity reversing circuit 10) and the output Q from the flip-flop 54 (which corresponds to the control signal $\phi_{15}$ shown in FIG. 10B) is provided, and an output from this AND gate 78 is used as the control signal $\phi'_{15}$ to the radiation source driving circuit 55, that the output $\overline{Q}$ from the flip-flop 54 (which corresponds to the signal $\overline{\phi_{15}}$) is used as the control signal $\phi''_{12}$ to the signal polarity reversing circuit 10', and that the AND gate 52 and 53 are so constructed that they may receive the output $\overline{Q}$ from the flip-flop 51, in place of the output Q therefrom, whereby they may produce an output of a timing as shown in FIG. 22 as the control signal $\phi_{14}$ to the sample-hold circuit 13' as well as the control signal $\phi_{14}$ to the integration circuit 11''. A reference numeral 79 designates an RS flip-flop to be reset by the output C from the programmable logic array 22, after it is set by the output B therefrom, the output Q ($\phi_L$) of which is used for operation in the scanning signal control section, i.e., the charge accumulation time controlling section, to be explained in reference to FIG. 23.

Referring to FIG. 23 which shows mainly the scanning signal control section in the abovementioned control circuit 12, i.e., the charge accumulation time controlling section, a reference numeral 80 is a presettable binary up-down counter of a trailing synchronous type and 4-bit construction for setting electric discharging time. In this illustrated embodiment, the counter is so constructed that it may count a single pulse signal output $\phi_{14}$ from the AND gate 53 in FIG. 21 at every unit integration period (a reset signal shown in FIG. 24). A numeral 81 refers to a power-up clear circuit which clears the content of the presettable up-down counter 80 at the time of powering up, and presets subsequently a set value of an initial value setting circuit 82 in the counter 80. The presettable up-down counter 80 is so controlled that it may count a single-pulse $\phi_R$ to be generasged at every unit integration period until the output ($V_{M'}$) from the sample-hold circuit 13' satisfies conditions for stopping increase and decrease in the electric discharging time, i.e., until a relationship of ref.$V_L \leq V_{M'out} \leq $ref.$V_H$ is established. Incidentally, ref.$V_L$ and ref.$V_{M'}$ correspond respectively to $V_{MIN}$ and $V_{MAX}$ as already explained with reference to FIG. 16. A reference numeral 83 designates a presettable binary counter for timing the electric discharging time, which is so constructed that it may count a predetermined division clock pulse $\phi_D$ to be the basis for the abovementioned integration clear signal $\phi_{IC}$ until a predetermined number will be counted with a counted output from the abovementioned presettable up-down counter 80 as the preset value. The counter 83 is loaded with the output from the counter 80 by a reversing signal of the output Q from the RS flip-flop 79 in FIG. 21 (the control signal $\phi_L$ shown in FIG. 22), starts further counting of the division clock pulse $\phi_D$ of the abovementioned integration clear signal $\phi_{IC}$ from the counted value of the presettable up-down counter 80 at the time instant when the control signal $\phi_L$ assumes the low level, and produces a carrier signal output CR at the time instant when it has counted upto a predetermined number. A numeral 84 refers to an inverter for setting the counter 83 in its count prohibition state by inverting the carrier signal CR to the low level when it is at the high level, and for setting the counter in its count possible state by inverting the carrier signal CR to the high level when it is at the low level. A reference numeral 85 designates a NAND gate which produces the integration clear signal $\phi_{IC}$ by taking a reversed logic product of the carrier signal output CR from the counter 83 and the output Q (control signal $\phi_L$) from the RS flip-flop 79 shown in FIG. 21. FIG. 25 shows a timing chart of $\phi_{SH}$, $\phi_L$, $\phi_D$, and $\phi_{IC}$. In this embodiment, the division clock pulse $\phi_D$ of the electric discharging time $T_1$ is selected in a clock frequency which divides the unit integration period into eighteen sections. Also, the control signal $\phi_L$ for determining the initial set value of the electric discharging time $T_1$ is so selected as to assume the low level while it is counting the pulse $\phi_D$ with nine pulses. Accordingly, in the embodimental device, nine kinds of the electric discharging time can be selected as shown in FIG. 25, whereby the charge accumulating time of the sensor array device 3 can be selected in the values of 9/18, 8/18, 7/18, ... 2/18, 1/18 depending on the magnitude of the signal charge at the time of driving the radiation source 2. It is of course possible that the timing of $\phi_L$ and the frequency of $\phi_D$ be appropriately selected depending on necessity. Numerals 86, 87, and 88 refer to trailing synchronous type D-flip-flops. When the output ($V_{M'}$) from the sample-hold circuit 13' is lower than ref.$V_L$ which has been set for the wind comparator 76, this signifies that accumulation of charge at the time of driving the radiation source 2 is excessive, hence the abovementioned presettable up-down counter 80 be rendered down-count. That is to say, in the case of $V_M < $ref.$V_L$, the output $V_L$ from the wind comparator 76 becomes high, so that the output from the invertor 80 becomes low in its level, and is introduced as an input into the input D of the D-flip-flop 88. At every termination of the unit intergration period, the D-flip-flop 88 receives in its trigger input the output from the AND gate 52 (i.e., the control signal $\phi'_{13}$) shown in FIG. 21, and applies the state of $V_L$ at this time instant to the count mode control input of the presettable up-down counter 80. In this instance, the output Q of the D-flip-flop 88 assumes the low level, and the state of the down-count is established. On the contrary, when $V_L$ is low in its level, the output from the inverter 89 becomes high, whereby the state of the up-count is established. A reference numeral 90 designates an exclusive NOR gate. When the output ($V_{M'}$) from the sample-hold circuit 13' satisfies the condition of ref.$V_L \leq V_{M'} \leq $ref.$V_{H'}$ both ouputs $V_H$ and $V_L$ from the wind comparator 76 assume the low level, whereby the output from the exclusive NOR gate 90 assumes the high level. When the output ($V_{M'}$) from the sample-hold circuit 13' is in other states than the above, the output from this exclusive NOR gate 90 is at the low level. Therefore, at the time instant when the input signal $\phi'_{13}$ is introduced into the trigger input of the D-flip-flop 86, if the output from the exclusive NOR gate 90 is at the high level, the output Q thereof also assumes the high level to render the presettable up-down count 80 to be in the state of the count prohibition and to stop the counting operation, thereby maintaining the charge accumulation time in the state of the current time instant.

FIG. 24 shows the timing chart. As seen from this chart, when the presettable up-down counter 80 continues the up-counting and reaches its count-up to the maximum counted value, the carrier signal CR assumes the high level. At this time instant, the counter 80 is set in its count prohibition state so that the content of the counter 80 may be maintained as it is. Conversely, even at the time instant when the counter continues it down-count and reaches its count-down to the minimum counted value, the carrier signal CR assumes the high level, thereby rendering the counter 80 to be in its count prohibition state and maintaining the minimum counted value as it is. The D-flip-flop 87 is to delay the output Q from the D-flip-flop 88 for the cycle of the signal $\phi'_{13}$. A reference numeral 91 designates an exclusive NOR gate to take an exclusive reversed logic sum of the output Q from each of the D-flip-flops 87 and 88, and a reference numeral 92 designates an AND gate for taking a logic product of an output from the exclusive NOR gate 91 and the carrier signal CR of the presettable up-down counter 80. The reversed logic sum of the output Q from the D-flip-flop 86 and the output from the AND gate 92 is taken by a NOR gate 93 and is applied to an enable terminal ENB of the counter 80 to control the state of the count possible or count prohibition. In case the presettable up-down count 80 counts the maximum or the minimum number, as the result of which it is in the count prohibition state, if there occurs change in the photographic conditions of the target object such as distance or reflective power thereof, the count prohibition state is released and a separate state of count number may be set. FIG. 26 shows a timing chart to explain this situation. In the timing chart, $\phi_{SH}$ refers to the shift pulse to the sensor array device 3; $\phi'_{13}$ designates a pulse for controlling a unit integration period which generates at every unit integration period (i.e., unit detection cycle); and $\phi_{14}$ is used as the reset pulse for the integration circuit 11'' as well as the count clock pulse for the presettable up-down counter 80. Next, state of changes in the output (M') from the integration circuit 11" will be shown diagrammatically. It should be noted that the output value (M') of the integration circuit 11" in the timing where the signal $\phi'_{13}$ is generated stands for the hold value $V_{M'}$ (shown by a broken line in the drawing) of the sample-hold circuit 13'. FF88Q and FF87Q respectively designate the outputs Q from the D-flip-flops 88 and 87, which shows their output changes as shown in the timing chart in FIG. 26 depending on whether the abovementioned $V_{M'}$ is lower or higher than ref.$V_L$. The left half (a) of FIG. 26 shows a state, wherein the count-down operation is sequentially performed in view of $V_{M'}$ being excessive in comparison with a predetermined value, and, as a result, when the count prohibition state is reached at the abovementioned minimum counted value, the content of the presettable up-down counter 80 is held. Subsequently, the count prohibition state is released due to occurrence of changes in the target object as mentioned above to effect the count-up operation. The right half (b) shows an example, wherein the counter 80 changes its state from the count-up to the count-down, as opposed to the abovementioned left half (a). It is apparent that, in this embodiment, the capacity of the counter 80 is set at eighteen, but this capacity can be arbitrarily selected depending on the design specification without affecting whatsoever the fundamentals of the counter. The content of the count is remarked at each single pulse position of $\phi_{14}$. In the left half (a) of FIG. 26, the output Q (FF88Q) of the flip-flop 88 assumes the high level with the initial timing of $\phi'_{13}$ after $V_{M'}$ becomes higher than ref.$V_L$. Subsequently, the output Q (FF87Q) of the flip-flop 87 assumes the high level with the subsequent timing of $\phi'_{13}$. On the other hand, at the right half (b) of FIG. 26, the output Q (FF88Q) of the flip-flop 88 changes from the high level to the low level with the timing of $\phi'_{13}$ after $V_{M'}$ becomes lower than ref.$V_L$, and subsequently, the output Q (FF87Q) of the flip-flop 87 assumes the low level. The output from the exclusive NOR gate 91 shown in FIG. 23 assumes the low level when the output Q (FF88Q) of the flip-flop 88 is at the high level and the output Q (FF87Q) of the flip-flop is at the low level. The output from the NOR gate 91 also assumes the low level even in the case of the outputs FF88Q and FF87Q being at the low level or the high level. The carrier signal CR of the counter 80 in this embodimental device is so constructed that the high level output may be produced when the content of the counter is 1 and 18. Accordingly, a signal output obtained by introducing the output from the AND gate 92 (EX-NOR).(CR) into the NOR gate 93 as an input thereinto and inverting the same establishes the count prohibition state during a period of from the time instant of the count minimum value "1" in the left and half (a) of FIG. 26 to a time instant when the output from the exclusive NOR gate 91 changes its level to low (which is indicated by ENB and INHIBIT in FIG. 26). In the example of the right half (b) of FIG. 26, INHIBIT is established up to the time instant when the output from the exclusive NOR gate 91 changes to the low level.

As it will be understandable from the foregoing explanations, even when the presettable up-down counter 80 counts the minimum or maximum value, and is brought into a state of INHIBIT without satisfying the predetermined condition of ref.$V_L = V_{M'} = $ ref.$V_H$, variations in the target object can be detected to release the state of INHIBIT.

Thus, the radiation beam incident position detecting device according to the present invention as has been detailed so far is so constructed that it may detect the incident position of the radiation beam on the incident surface thereof by disposing the scanning type radiation sensing means with substantial coincidence with the incident plane of the radiation beam, dividing the time-sequential output signal from the sensing means for each predetermined section, and comparing the signal quantities for each section. According to this invention, the incident position of the radiation beam on a predetermined surface can be detected in a simpler method by use of the scanning type radiation sensing means such as sensor array device, etc., hence with constantly high precision and accuracy without inviting any complication in the construction of the electrical circuit system. Therefore, the device according to the present invention is highly useful when it is adopted particularly in the active type distance detecting device or the focus detecting device as mentioned at the outset.

Further, according to the embodiments explained with reference to FIGS. 10 and 11, even when the signal radiation beam is to be detected in the presence of harmful radiation due to external light etc., more particularly, even when the energy distribution of such harmful radiation on the detection surface (i.e., the abovementioned incident surface) is non-uniform, it is possible to carry out accurate detection of the signal radiation beam, while effectively avoiding the mal-effect by such harmful radiation, in respect of which, therefore, the device according to the present invention is very useful.

Furthermore, according to the embodiments explained with reference to FIGS. 13 through 19 inclusive, even when intensity of the signal radiation beam to be detected varies considerably, the device according to the present invention can advantageously maintain its constant detection precision without being affected thereby. In particular, the embodiments as explained with reference to FIGS. 16 to 19 are highly useful in that, even under such condition where the intensity of the signal radiation beam becomes excessive, stable detection can be performed by the control of the output level of the sensing means.

In the foregoing description, the TTL type, active focus detection device has been explained as an example of application of the present device. It should, however, be noted that application of the present device is not limited to such focus detecting device, but it can be widely applicable to various appliances and instruments necessitating such detection of the radiation beam incident position, in which case, too, the advantages as mentioned above can be obtained. Moreover, in the above-described embodiments of the present invention, the self-scanning type solid-state picture-taking element known as the sensor array device has been exemplified as the scanning type radiation sensing means. Besides this, other picture-taking tubes known as Vidicon, Saticon, Calnicon, etc. can be equally used. In the embodiments so far described, the integrated quqntity of signal is found out as the signal quantity for each divided section. Besides this, it is also possible to find out the peak value of the signal in each section or an average value of the signal in each section. These values as discovered may be compared to obtain the signal quantity. Moreover, in the foregoing explanations of the embodiment according to the present invention, the method of reverse integration is adopted as the method for comparing the signal quantity in each devided section. Besides this method, it is also possible that the signal in each section is individually integrated or its peak value is found out, and then these values are applied to a differential amplifier circuit to obtain its difference (S), or compared by use of a comparison circuit.

In the embodiments as explained with reference to FIGS. 16 to 26, only the gain control to the sensor array device has been explained as one method of controlling the output level of the sensor array device. In addition to this, there may be exemplified, as the method for attaining the same degree of effect, control of the scanning signal, i.e, the sensor device output, by increase or decrease in the incident radiation beam energy to the sensor array device, or control of the scanning signal by controlling both sensor gain and incident radiation beam energy. In this way, conditions for designing the device can be widened, hence the optimum conditions meeting a particular device can be selected with wide range. Incidentally, the control of the incident radiation beam energy in this case is readily made possible by, for example, controlling the illuminating level of the radiation beam on the scanning surface by means of a variable aperture, etc., or, in the case of the device as described in the foregoing embodiments, in particular, it is made possible by controlling the projecting radiation beam energy of the radiation source. In more detail, when relying on use of the variable aperture, the opening of the aperture is enlarged if an output from the sample-hold circuit 13' shown in FIGS. 16, 20B is excessively small, and the aperture is made small if the output is excessively large. When relying on adjustment of the projecting radiation beam energy of the radiation source, the projecting time or projecting power of the radiation source per unit scanning (in the case of the embodimental device in FIG. 16) or unit detection cycle (in the case of the embodimental device shown in FIGS. 20A and 20B) is increased, if an output from the abovementioned sample-hold circuit 13' is excessively small, or the projecting time or the projecting power is decreased, if the output is excessively large. Adjustment of this scanning signal level can also be performed to the same degree by adjusting the gain (rate of amplification) of the output amplifier usually provided for amplifying the sensor device output. In this case, the gain of the amplifier is increased when the output from the sample-hold circuit 13' is excessively small, while the gain is decreased when the output is excessively small.

What we claim is:

1. A device for detecting a position of a substantial center of gravity of a distribution pattern of a radiation on a predetermined plane, comprising:
   (a) scanning means for scanning said distribution pattern of the radiation on said plane, said scanning means generating a time-sequential output signal representing the radiation distribution pattern on said plane; and
   (b) circuit means for detecting the position of the substantial center of gravity of said radiation distribution pattern on said plane on the basis of the time-sequential output signal from said scanning means, said circuit means dividing the time-sequential output signal into predetermined signal sections and generating an output which varies with the change in the position of the substantial center of gravity of said radiation distribution pattern on said plane.

2. The device as set forth in claim 1, wherein said circuit means divides the time-sequential output signal from said scanning means into two signal sections of mutually the same size, and substantially compares the signal quantities in said two signal sections, thereby generating the output representing the position of the substantial center of gravity of said radiation distribution pattern on said plane with a position on said plane corresponding to a dividing point of the signal as a reference.

3. The device as set forth in claim 2, wherein said circuit means performs an operation to be expressed by the following equation:

$$\int_{t_i}^{t_j} V(t)dt - \int_{t_j}^{t_k} V(t)dt \text{ or } - \int_{t_i}^{t_j} V(t)dt + \int_{t_j}^{t_k} V(t)dt$$

where: $V(t)$ denotes the time-sequential output signal of said scanning means; and $ti-tj$ and $tj-tk$ represent time ranges corresponding to said two signal, respectively, provided $ti-tj=tj-tk$.

4. The device as set forth in claim 3, wherein said circuit means includes:
   polarity reversing means for reversing the polarity of the signal corresponding to one of said signal sections so that the polarities of the signals corresponding to said two signal sections are in a mutually opposite relationship; and
   integration means for sequentially integrating the signal corresponding to the one of said signal sections, the polarity of which has been reversed by said polarity reversing means, and the signal corresponding to the other signal section, the polarity of which has not been reversed, an output from said integration means representing the position of the substantial center of gravity of said radiation distribution pattern on said plane.

5. The device as set forth in any one of claims 1 to 4, further including:
   control means for repeatedly performing the scanning operation of said scanning means and the detecting operation of said circuit means accompanying said scanning operation, said circuit means adding newly obtained data to those already obtained data at every time it repeats the detecting operation, and holding the same;
   counting means for counting the number of times of the detecting operation by said circuit means, said counting means generating a characteristic output when the number of times of the detecting operation by said circuit means reaches predetermined number of times; and
   sampling means for sampling an output from said circuit means based on the characteristic output from said counting means, an output from said sample means representing the position of the substantial center of gravity of said radiation distribution pattern on said plane.

6. The device as set forth in claim 5, further including:
   clearing means for clearing the data as held by said circuit means after termination of the data sampling by said sampling means.

7. The device as set forth in claim 5, further including:
   total sum integrated value detecting means for finding out an integrated value of the total sum of the signal quantities in said signal sections at the time of repetition of the detecting operation by said circuit means; and comparison means for detecting whether the output level of said total sum integrated value detecting means has reached a predetermined level or not, said comparison means generating a characteristics output when the output level of said total sum integrated value detecting means reaches the predetermined level, said sampling means being capable of responding to both outputs from said counting means and said comparison means, and sampling the output from said circuit means based on a horologically preferential output.

8. The device as set forth in claim 7, further including:

clearing means to clear the data held by said circuit means and said total sum integrated value detecting means, after termination of the data sampling by said sampling means.

9. The device as set forth in any one of claims 1 to 4, further including:

control means for repeatedly performing the scanning operation of said scanning means and the detecting operation of said circuit means accompanying said scanning operation, said circuit means adding newly obtained data to those already obtained data at every time it repeats the detecting operation, and holding the same;

total sum integrated value detecting means for finding out an integrated value of the total sum of the signal quantities in said signal sections at the time of repeated detecting operation by said circuit means;

comparison means for detecting whether the output level of said total sum integrated value detecting means has reached a predetermined level or not, said comparison means generating a characteristics output when the output level of said total sum integrated value detecting means reaches the predetermined level; and sampling means for sampling the output from said circuit means based on the characteristic output from said comparison circuit, an output from said sampling means representing the position of the substantial center of gravity of said radiation distribution pattern on said plane.

10. The device as set forth in claim 9, further including:

clearing means to clear the data held by said circuit means and said total sum integrated value detecting means, after termination of the data sampling by said sampling means.

11. The device as set forth in claim 9, further including:

unit total sum integrating means for finding out the total sum of the signal quantities in said signal sections at every one detecting operation, when said circuit means repeats its detecting operation; and signal level control means to control a level of an output signal from said scanning means based on the output from said unit total sum integrating means.

12. The device as set forth in claim 11, wherein said scanning means is a signal integrating and accumulating type scanning means having the functions of generating an electrical signal in accordance with energy intensity of said radiation pattern at every fine portion thereof and of accumulating the electrical signal therein, and said signal level control means is signal integration time control means which controls a level of the output signal therefrom by controlling the signal integration time of said scanning means based on the output from said unit total sum detecting means.

13. The device as set forth in claim 5, further including:

unit total sum integrating means for finding out the total sum of the signal quantities in said signal sections at every one detecting operation when said circuit means repeats its detecting operation; and signal level control means to control a level of an output signal from said scanning means based on the output from said unit total sum integrating means.

14. The device as set forth in claim 13, wherein said scanning means is a signal integrating and accumulating type scanning means having the functions of generating an electrical signal in accordance with energy intensity of said radiation pattern at every fine portion thereof and of accumulating the electrical signal therein, and said signal level control means is signal integration time control means which controls a level of the output signal therefrom by controlling the signal integration time of said scanning means based on the output from said unit total sum detecting means.

15. The device as set forth in any one of claims 1 to 4, further including:

unit total sum integrating means for finding out the total sum of the signal quantities in said signal sections at every one detecting operation when said circuit means repeats its detecting operation; and signal level control means to control a level of an output signal from said scanning means based on the output from said unit total sum integrating means.

16. The device as set forth in claim 15, wherein said scanning means is a signal integrating and accumulating type scanning means having the functions of generating an electrical signal in accordance with energy intensity of said radiation pattern at every fine portion thereof and of accumulating the electrical signal therein, and said signal level control means is signal integration time control means which controls a level of the output signal therefrom by controlling the signal integration time of said scanning means based on the output from said unit total sum detecting means.

17. The device as set forth in claim 2, wherein said radiation is an intermittent radiation which projects intermittently onto said predetermined plane, and said circuit means is so constructed that it may perform an operation to be expressed by the following equation, when a time-sequential signal of said scanning means corresponding to a state where said radiation is projecting onto said predetermined plane is denoted by V(t), an output signal of said scanning means corresponding to a state where said radiation is not projecting onto said plane is represented by V'(t), and time ranges corresponding to said two signal sections are denoted by $t_i - t_j$ and $t_j - t_k$, respectively, projected $t_i - t_j = t_j - t_k$:

$$- \int_{t_i}^{t_j} V(t)dt + \int_{t_j}^{t_k} V(t)dt + \int_{t_i}^{t_j} V'(t)dt - \int_{t_j}^{t_k} V'(t)dt$$

or

-continued
$$-\int_{t_i}^{t_j} V(t)dt + \int_{t_j}^{t_k} V(t)dt + \int_{t_i}^{t_k} V'(t)dt - \int_{t_j}^{t_k} V'(t)dt.$$

18. The device as set forth in claim 17, wherein said circuit means comprising:
   polarity reversing means for reversing the polarity of a signal corresponding to a predetermined signal section so that the polarities of the signals corresponding to said two signal sections are in a mutually opposite relationship and so that the polarity polarities of the signals for the relatively corresponding signal are in a mutually opposite relationship between the output signal from said scanning means corresponding to a state where said radiation is projecting onto said plane and the output signal from said scanning means corresponding to a state where said radiation is not projecting onto said plane; and
   integration means for sequentially integrating, during one detection cycle, the signal whose polarity has been reversed by said polarity reversing means and the signal whose polarity has not been reversed by said polarity reversing means, when one reading from said scanning means of the output signal corresponding to a state where said radiation is projecting onto said plane and one reading of the output signal corresponding to a state where said radiation is not projecting onto said plane are made to constitute one detection cycle, an output from said integration means representing the position of the substantial center of gravity of said radiation distribution pattern on said plane.

19. The device as set forth in claim 17 or 18, further comprising:
   control means for repeatedly performing the detecting operations of said circuit means which makes the one reading, out of said scanning means, of the output signal corresponding to a state where said radiation is projecting onto said plane and the one reading of the output signal corresponding to a state where said radiation is not projecting onto said plane to constitute the one detection cycle, said circuit means adding newly obtained data at every repetition of the detecting cycle to the already obtained data, and holding the same therein;
   counting means for counting number of times of said detecting cycle, said counting means generating a characteristic output when the number of times of said detecting cycle has reached predetermined number of times; and
   sampling means for sampling the output from said circuit means based on the characteristic output from said counting means, an output from said sampling means representing the position of the substantial center of gravity of said radiation distribution pattern on said plane.

20. The device as set forth in claim 19, further including:
   clearing means for clearing the data as held by said circuit means after termination of the data sampling by said sampling means.

21. The device as set forth in claim 19, further including:
   total sum difference integrated value detecting means to find out, at the time of repetition of said detecting cycle, an integrated value of a difference between the total sum of the signal quantities in said both signal sections with respect to the output signal from said scanning means corresponding to a state where said radiation is projecting onto said plane and the total sum of the signal quantities in said both signal sections with respect to the output signal from said scanning means corresponding to a state where said radiation is not projecting onto said plane; and
   comparison means to detect whether the output level of said total sum difference integrated value detecting means has reached a predetermined level or not, said comparison means generating a characteristic output when the output level of the total sum difference integrated value detecting means reaches the predetermined level,
   said sampling means being capable of responding to both outputs from said counting means and said comparison means, and sampling the output from said circuit means based on a horologically preferential output.

22. The device as set forth in claim 21, further including:
   clearing means to clear the data held by said circuit means and said total sum difference integrated value detecting means, after termination of the data sampling by said sampling means.

23. The device as set forth in claim 17 or 18, further including:
   control means for repeatedly performing the detecting operations of said circuit means which makes the one reading, out of said scanning means, of the output signal corresponding to a state where said radiation is projecting onto said plane and the one reading of the output signal corresponding to a state where said radiation is not projecting onto said plane to constitute the one detection cycle, said circuit means adding newly obtained data at every repetition of the detecting cycle to the already obtained data, and holding the same therein;
   total sum difference integrated value detecting means to find out, at the time of repetition of said detecting cycle, an integrated value of a difference between the total sum of the signal quantities in said both signal sections with respect to the output signal from said scanning means corresponding to a state where said radiation is projecting onto said plane and the total sum of the signal quantities in said both signal sections with respect to the output signal from said scanning means corresponding to a state where said radiation is not projecting on said plane;
   comparison means to detect whether the output level of said total sum difference integrated value detecting means has reached a predetermined level or not, said comparison means generating a characteristic output when the output level of the total sum difference integrated value detecting means reaches the predetermined level; and
   sampling means to sample an output from said circuit means based on the characteristic output from said comparison means, an output from said sampling means representing the position of the substantial center of gravity of said radiation distribution pattern on said plane.

24. The device as set forth in claim 23, further including:

clearing means to clear the data held by said circuit means and said total sum difference integrated value detecting means, after termination of the data sampling by said sampling means.

25. The device as set forth in claim 23, further including:
   unit total sum difference detecting means to find out, at every one detecting cycle during repetition of said detecting cycles, a difference between the total sum of the signal quantities in said both signal sections with respect to the output signal from said scanning means corresponding to a state where said radiation is projecting onto said plane and the total sum of the signal quantities in said both signal sections with respect to the output signal from said scanning means corresponding to a state where said radiation is not projecting onto said plane; and
   signal level control means to control a level of an output signal from said scanning means based on the output from said unit total sum difference detecting means.

26. The device as set forth in claim 25, wherein said scanning means is a signal integrating and accumulating type scanning means having the functions of generating an electrical signal in accordance with energy intensity of said radiation pattern at every fine portion thereof and of accumulating the electrical signal therein, and said signal level control means is signal integration time control means which controls a level of the output signal therefrom by controlling the signal integration time of said scanning means based on the output from said unit total sum difference detecting means.

27. The device as set forth in claim 19, further including:
   unit total sum difference detecting means to find out, at every one detecting cycle during repetition of said detecting cycle, a difference between the total sum of the signal quantities in said both signal sections with respect to the output signal from said scanning means corresponding to a state where said radiation is projecting onto said plane and the total sum of the signal quantities in said both signal sections with respect to the output signal from said scanning means corresponding to a state where said radiation is not projecting onto said plane; and
   signal level control means to control a level of an output signal from said scanning means based on the output from said unit total sum difference detecting means.

28. The device as set forth in claim 27, wherein said scanning means is a signal integrating and accumulating type scanning means having the functions of generating an electrical signal in accordance with energy intensity of said radiation pattern at every fine portion of said radiation pattern, and of accumulating the electrical signal therein, and said signal level control means is signal integration time control means which controls a level of the output signal therefrom by controlling the signal integration time of said scanning means based on the output from said unit total sum difference detecting means.

29. The device as set forth in claim 17 or 18, further including:
   unit total sum difference detecting means to find out, at every detecting cycle during repetition of the detecting cycle which constitutes one detecting cycle with the one reading of the output signal from said scanning means corresponding to a state where said radiation is projecting onot said plane and the one reading of the output signal corresponding to a state where said radiation is not projecting onto said plane, a difference between the total sum of the signal quantities in said both signal sections with respect to the output signal from said scanning means corresponding to a state where said radiation is projecting onto said plane and the total sum of the signal quantities in said both signal sections with respect to the output signal from said scanning means corresponding to a state where said radiation is not projecting onto said plane; and
   Signal level control means to control a level of an output signal from said scanning means based on the output from said unit total sum difference detecting means.

30. The device as set forth in claim 29, wherein said scanning means is a signal integrating and accumulating type scanning means having the functions of generating an electrical signal in accordance with energy intensity of said radiation pattern at every fine portion of said radiation pattern, and of accumulating the electrical signal therein, and said signal level control means is signal integration time control means which controls a level of the output signal therefrom by controlling the signal integration time of said scanning means based on the output from said unit total sum difference detecting means.

31. In an optical instrument having an objective lens means which is movable along an optical axis so as to form an image of an object on a predetermined imaging plane, a system for detecting focusing condition of said objective lens means to said object, comprising:
   (a) radiation projecting means for projecting radiation toward said object through a part of said objective lens means, said radiation projecting means having a radiation generating source, and a substantial center of said radiation generating source being disposed in substantial coincidence with a predetermined position on a first plane conjugative with said predetermined imaging plane, and a position, on a second plane conjugative with said first plane, of a substantial center of gravity of a pattern of said radiation reflected by said object after being projected from said radiation projecting means through a part of said objective lens means and entering through the other part of said objective lens means varying in accordance with the focusing condition of the objective means lens means to said object;
   (b) scanning means for scanning said radiation pattern on said second plane, said scanning means having a radiation receiving plane substantially coincident with said second plane, a predetermined position on said radiation receiving plane being disposed in substantial coincidence with a position which is conjugative with said predetermined position on said first plane, and said scanning means generating a time-sequential output signal representing the radiation pattern on said radiation receiving plane; and
   (c) circuit means for detecting a position of a substantial center of gravity of the pattern of said reflected radiation on said second plane on the basis of the time-sequential output signal from said scanning means, said circuit means dividing said time-sequential output signal into two signal sections of substantially the same size on the march of a point corresponding to said predetermined position on said radiation receiving plane of said scanning means and generating an output representing the position of the substantial center of gravity of the pattern of said reflected radiation on said second plane, hence the focusing condition of said objective lens means with respect to said object.

32. The system as set forth in claim 31, wherein said circuit means is so constructed that it performs an operation to be expressed by the following equation $$\int_{t_i}^{t_j} V(t)dt - \int_{t_j}^{t_k} V(t)dt \text{ or } - \int_{t_i}^{t_j} V(t)dt + \int_{t_j}^{t_k} V(t)dt$$

where V(t) denotes the time-sequential output signal of said scanning means; and ti-tj and tj-tk represent time ranges corresponding to said two signal sections, respectively, provided $t_i - t_j = t_j - t_k$.

33. The system as set forth in claim 32, wherein said circuit means includes:
polarity reversing means for reversing the polarity of the signal corresponding to one of said signal sections in such a manner that the polarity of the signals corresponding to said two signal sections may be in a mutually opposite relationship; and
integration means for sequentially integrating the signal corresponding to one of said signal sections, the polarity of which has been reversed by said polarity reversing means, and the signal corresponding to the other signal sections, the polarity of which has not been reversed, an output from said integration means representing the position of the substantial center of gravity of the pattern of said reflected radiation on said second plane.

34. The system as set forth in claim 31, further including:
control means for repeatedly performing the scanning operation of said scanning means and the detecting operation of said circuit means accompanied by said scanning operation, said circuit means adding newly obtained data to those already obtained data at every time it repeats the detecting operation, and holding the same;
counting means for counting the number of times of the detecting operation by said circuit means, said counting means generating a characteristic output when the number of times of the detecting operation by said circuit means reaches predetermined number of times; and
sampling means for sampling an output from said circuit means based on the characteristic output from said counting means, an output from said sampling means representing the position of the substantial center of gravity of the pattern of said reflected radiation on said second plane.

35. The system as set forth in claim 34, further including:
clearing means for clearing the data as held by said circuit means after completion of the data sampling by said sampling means.

36. The system as set forth in claim 34, further including:
total sum integrated value detecting means for finding out an integrated value of the total sum of the signal quantities in said signal sections at the time of repetition of the detecting operation by said circuit means; and comparison means for detecting whether the output level of said total sum integrated value detecting means has reached a predetermined level or not, said comparison means generating a characteristics output when the output level of said total sum integrated value detecting means reaches the predetermined level,
said sampling means being capable of responding to both outputs from said counting means and said comparison means, and sampling the output from said circuit means based on a horologically preferential output.

37. The system as set forth in claim 36, further including:
clearing means to clear the data held by said circuit means and said total sum integrated value detecting means, after termination of the data sampling by said sampling means.

38. The system as set forth in claim 31, further including:
control means for repeatedly performing the scanning operation of said scanning means and the detecting operation of said circuit means accompanying said scanning operation, said circuit means adding newly obtained data to those already obtained data at every time it repeats the detecting operation, and holding the same;
total sum integrated value detecting means for finding out an integrated value of the total sum of the signal quantities in said signal sections at the time of repeated detecting operation by said circuit means;
comparison means for detecting whether the output level of said total sum integrated value detecting means has reached a predetermined level or not, said comparison means generating a characteristic output when the output level of said total sum integrated value detecting means reaches the predetermined level; and
sampling means for sampling the output from said circuit means based on the characteristic output from said comparison circuit, an output from said sampling means representing the position of the substantial center of gravity of the pattern of said reflected radiation on said second plane.

39. The system as set forth in claim 38, further including:
clearing means to clear the data held by said circuit means and said total sum integrated value detecting means, after termination of the data sampling by said sampling means.

40. The system as set forth in any one of claims 31 to 39, further including:
unit total sum integrating means for finding out the total sum of the signal quantities in said signal sections at every one detecting operation when said circuit means repeats its detecting operation; and
signal level control means to control a level of an output signal from said scanning means based on the output from said unit total sum integrating means.

41. The system as set forth in claim 40, wherein said scanning means is a signal integrating and accumulating type scanning means having the functions of generating an electrical signal in accordance with energy intensity of said radiation pattern at every fine portion thereof and a accumulating the electrical signal therein, and said signal level control means is signal integration time control means which controls a level of the output signal therefrom by controlling the signal integration time of said scanning means based on the output from said unit total sum detecting means.

42. The system as set forth in claim 31, further including:
   projection control means to cause said radiation projecting means to intermittently project said radiation, said circuit means being so constructed that, at the time of said intermittent projection of the radiation, it performs an operation to be expressed by the following equation, when a time-sequential signal of said scanning means corresponding to a state where said radiation is projecting onto said predetermined plane is denoted by V(t), an output signal of said scanning means corresponding to a state where said radiation is not projecting onto said plane is represented by V'(t), and time ranges corresponding to said two signal sections are denoted by ti-tj and tj-tk, respectively, provided $ti - tj = tj - tk$:

$$- \int_{t_i}^{t_j} V(t)dt + \int_{t_j}^{t_k} V(t)dt + \int_{t_i}^{t_j} V'(t)dt - \int_{t_j}^{t_k} V'(t)dt$$

or $$- \int_{t_i}^{t_j} V(t)dt + \int_{t_j}^{t_k} V(t)dt + \int_{t_i}^{t_k} V'(t)dt - \int_{t_j}^{t_k} V'(t)dt.$$

43. The system as set forth in claim 42, wherein said circuit means comprising:
   polarity reversing means for reversing the polarity of a signal corresponding to a predetermined signal section so that the polarities of the signals corresponding to said two signal sections are in a mutually opposite relationship and so that the polarities of the signals for the relatively corresponding signal sections are in a mutually opposite relationship between the output signal from said scanning means corresponding to a state where said radiation is projecting onto said second plane and the output signal from said scanning means corresponding to a state where said radiation is not projecting onto said second plane; and
   integration means for sequentially integrating, during one detection cycle, the signal whose polarity has been reversed by said polarity reversing means and the signal whose polarity has not been reversed by said polarity reversing means, when one reading from said scanning means of the output signal corresponding to a state where said radiation is projecting onto said second plane and one reading of the output signal corresponding to a state where said radiation is not projecting onto said second plane are made to constitute one detection cycle, an output from said integration means representing the position of the substantial center of gravity of the pattern of said reflected radiation on said second plane.

44. The system as set forth in claim 42, further comprising:
   control means for repeatedly performing the detecting operations of said circuit means which makes the one reading, out of said scanning means, of the output signal corresponding to a state where said radiation is projecting onto said second plane and the one reading of the output signal corresponding to a state where said radiation is not projecting onto said second plane to constitute the one detection cycle, said circuit means adding newly obtained data at every repetition of the detecting cycle to the already obtained data, and holding the same therein;
   counting means for counting number of times of said detecting cycle, said counting means generating a characteristic output when the number of times of said detecting cycle has reached predetermined numbers of times; and
   sampling means for sampling the output from said circuit means based on the characteristic output from said counting means, an output from said sampling means representing the position of the substantial center of gravity of the pattern of said reflected radiation on said second plane.

45. The system as set forth in claim 44, further including:
   clearing means for clearing the data as held by said circuit means after termination of the data sampling by said sampling means.

46. The system as set forth in claim 44, further including:
   total sum difference integrated value detecting means to find out, at the time of repetition of said detecting cycle, an integrated value of a difference between the total sum of the signal quantities in said both signal sections with respect to the output signal from said scanning means corresponding to a state where said radiation is projecting onto said second plane and the total sum of the signal quantities in said both signal sections with respect to the output signal from said scanning means corresponding to a state where said radiation is not projecting onto said second plane; and
   comparison means to detect whether the output level of said total sum difference integrated value detecting means has reached a predetermined level or not, said comparison means generating a characteristic output when the output level of the total sum difference integrated value detecting means reaches the predetermined level.
   said sampling means being capable of responding to both outputs from said counting means and said comparison means, and sampling the output from said circuit means based on a horologically preferential output.

47. The system as set forth in claim 46, further including:
   clearing means to clear the data held by said circuit means and said total sum difference integrated value detecting means, after termination of the data sampling by said sampling means.

48. The system as set forth in claim 42, further including:
   control means for repeatedly performing the detecting operations of said circuit means which makes the one reading, out of said scanning means, of the output signal corresponding to a state where said radiation is projecting onto said second plane and the one reading of the output signal corresponding to a state where said radiation is not projecting onto said second plane to constitute the one detection cycle, said circuit means adding newly obtained data at every repetition of the detecting cycle to the already obtained data, and holding the same therein;

total sum difference integrated value detecting means to find out, at the time of repetition of said detecting cycle, an integrated value of a difference between the total sum of the signal quantities in said both signal sections with respect to the output signal from said scanning means corresponding to a state where said radiation is projecting onto said second plane and the total sum of the signal quantities in said both signal sections with respect to the output signal from said scanning means corresponding to a state where said radiation is not projecting on said second plane, comparison means to detect whether the output level of said total sum difference integrated value detecting means has reached a predetermined level or not, said comparison means generating a characteristic output when the output level of the total sum difference integrated value detecting means reaches the predetermined level, and sampling means to sample an output from said circuit means based on the characteristic output from said comparison means, an output from said sampling means representing the position of the substantial center of gravity of the pattern of said reflected radiation on said second plane.

49. The system as set forth in claim 48, further including:

clearing means to clear the data held by said circuit means and said total sum difference integrated value detecting means, after termination of the data sampling by said sampling means.

50. The system as set forth in any one of claims 42 to 48, further including:

unit total sum difference detecting means to find out, at every detecting cycle during repetition of the detecting cycle which constitutes one detecting cycle with the one reading of the output signal from said scanning means corresponding to a state where said radiation is projecting onto said second plane and the one reading of the output signal corresponding to a state where said radiation is not projecting onto said second plane, a difference between the total sum of the signal quantities in said both signal sections with respect to the output signal from said scanning means corresponding to a state where said radiation is projecting onto said second plane and the total sum of the signal quantities in said both signal sections with respect to the output signal from said scanning means corresponding to a state where said radiation is not projecting onto said second plane; and signal level control means to control a level of an output signal from said scanning means based on the output from said unit total sum difference detecting means.

51. The system as set forth in claim 50, wherein said scanning means is a signal integrating and accumulating type scanning means having the functions of generating an electrical signal in accordance with energy intensity of said radiation pattern at every fine portion thereof and of accumulating the electrical signal therein, and said signal level control means is signal integration time control means which controls a level of the output signal therefrom by controlling the signal integration time of said scanning means based on the output from said unit total sum difference detecting means.

* * * * *

UNITED STATES PATENT AND TRADEMARK OFFICE
CERTIFICATE OF CORRECTION

PATENT NO. : 4,384,199
DATED : May 17, 1983
INVENTOR(S) : Yasuo Ogino, et al.

It is certified that error appears in the above-identified patent and that said Letters Patent is hereby corrected as shown below:

Col. 2, line 10, change "rooms" to --room--.

Col. 5, line 49, change "DRAWING" to --DRAWINGS--.

Col. 7, line 60, insert --a-- between "such" and "one".

Col. 8, line 6, insert --a-- between "such" and "one".

Col. 10, line 50, change "examplanations" to --explanations--.

Col. 11, line 6, change "number of phase" to --number of phases--.

Col. 15, line 3, change "$\phi 12$" (first occurrence) to --$\overline{\phi 12}$--.
line 4, change "$\overline{\phi 12}$" (second occurrence) to --$\phi 12$--.
line 4, change "inverted" to --inverter--.

Col. 16, line 23, change "period" to --periods--.
line 48, after "detected" insert --for--.

Col. 17, line 38, change "Bout" to --B out--.
line 44, change "Cout" to --C out--.
line 63, change "flip-flot" to flip-flop--.

Col. 19, line 15, insert --the-- after "exactly".

Col. 20, line 25, change "stably" to --stable--.

Col. 21, line 36, change "the" to --to--.
line 42, change "assume" to --assumes--.

Col. 24, line 55, change "VM" to --Vm--

Col. 27, line 8, change "generaged" to --generated--.

UNITED STATES PATENT AND TRADEMARK OFFICE
CERTIFICATE OF CORRECTION

PATENT NO. : 4,384,199                    Page 2 of 2

DATED     : May 17, 1983

INVENTOR(S) : Yasuo Ogino, et al.

It is certified that error appears in the above-identified patent and that said Letters Patent is hereby corrected as shown below:

Col. 29, line 44, insert --87-- between "flip-flop" and "is".

Col. 30, line 59, change "quqntity" to --quantity--.
        line 68, change "devided" to --divided--.

Col. 32, line 19, change "signal" to --signals--.

Col. 33, line 6, change "characteristics" to --characteristic--.

Col. 35, line 12, delete "polarity"

Col. 38, line 1, change "onot" to --onto--.
        line 49, after "objective" delete "means"

Col. 40, line 5, change "characteristics" to --characteristic--.
        line 66, change "a" to --of--.

Col. 41, line 28, in second equation, change "$\int_{ti}^{tk}$" to --$\int_{ti}^{tj}$--

Signed and Sealed this

Thirteenth Day of March 1984

[SEAL]

Attest:

GERALD J. MOSSINGHOFF

Attesting Officer         Commissioner of Patents and Trademarks